United States Patent
Koyabu et al.

(10) Patent No.: US 11,428,663 B2
(45) Date of Patent: Aug. 30, 2022

(54) GAS SENSOR CONTROL DEVICE

(71) Applicant: DENSO CORPORATION, Kariya (JP)

(72) Inventors: Tadakatsu Koyabu, Kariya (JP); Yuki Murayama, Kariya (JP); Ryozo Kayama, Kariya (JP); Akari Hasegawa, Kariya (JP); Yusuke Kawamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 271 days.

(21) Appl. No.: 16/692,339

(22) Filed: Nov. 22, 2019

(65) Prior Publication Data

US 2020/0088673 A1 Mar. 19, 2020

Related U.S. Application Data

(63) Continuation of application No. PCT/JP2018/020206, filed on May 25, 2018.

(30) Foreign Application Priority Data

May 26, 2017 (JP) .............................. JP2017-104900

(51) Int. Cl.
*G01N 27/416* (2006.01)
*G01N 27/407* (2006.01)

(52) U.S. Cl.
CPC ......... *G01N 27/416* (2013.01); *G01N 27/407* (2013.01)

(58) Field of Classification Search
CPC ... G01N 27/416; G01N 27/407; G01N 27/419
See application file for complete search history.

(56) References Cited

U.S. PATENT DOCUMENTS

| | | | | |
|---|---|---|---|---|
| 2003/0121310 A1* | 7/2003 | Tomura | ................ | G01N 27/419 73/31.05 |
| 2003/0121311 A1* | 7/2003 | Tomura | ................ | G01N 27/419 73/35.05 |
| 2007/0119708 A1* | 5/2007 | Oya | ................... | G01N 33/0037 204/401 |

(Continued)

FOREIGN PATENT DOCUMENTS

| | | | | |
|---|---|---|---|---|
| JP | 2009-175013 | | 8/2009 | |
| WO | WO-2015040843 A1 * | | 3/2015 | ........... G01N 27/419 |

*Primary Examiner* — Joshua L Allen
(74) *Attorney, Agent, or Firm* — Nixon & Vanderhye P.C.

(57) ABSTRACT

Each of SCUs to includes: a voltage switching unit that performs a first voltage switching to increase an oxygen concentration in a gas chamber and a second voltage switching to decrease the oxygen concentration in the gas chamber after the execution of the first voltage switching; an output change calculation unit that calculates an output change parameter indicating a change in output of the sensor cell according to the voltage switching; a concentration difference calculation unit that calculates a concentration difference parameter indicating a concentration difference in the oxygen concentration or in the concentration of the specific gas in the detection target gas between before the first voltage switching and after the second voltage switching; and a deterioration determination unit that determines a deterioration state of the sensor cell based on the output change parameter and the concentration difference parameter.

14 Claims, 12 Drawing Sheets

(56) References Cited

U.S. PATENT DOCUMENTS

| | | | |
|---|---|---|---|
| 2014/0238853 A1* | 8/2014 | Yoshida | G01N 27/409 |
| | | | 204/401 |
| 2015/0013431 A1* | 1/2015 | Kakimoto | G01N 27/419 |
| | | | 73/23.31 |
| 2016/0223488 A1* | 8/2016 | Kayama | G01N 27/41 |
| 2017/0184536 A1 | 6/2017 | Kawamoto et al. | |

* cited by examiner

GAS SENSOR CONTROL DEVICE

CROSS-REFERENCE TO RELATED APPLICATION

This application is a U.S. application under 35 U.S.C. 111(a) and 363 that claims the benefit under 35 U.S.C. 120 from International Application No. PCT/JP2018/020206 filed on May 25, 2018, the entire contents of which are incorporated herein by reference. This application is also based on and claims the benefit of priority to Japanese Patent Application No. 2017-104900 filed on May 26, 2017, the description of which is incorporated herein by reference.

BACKGROUND

Technical Field

The present disclosure relates to a gas sensor control device.

Background Art

As a gas sensor detecting the concentration of a specific gas component in a detection target gas such as exhaust gas from an internal combustion engine, there is known a NOx sensor detecting the concentration of NOx (nitrogen oxides). The NOx sensor has a three-cell structure formed from a pump cell, a monitor cell, and a sensor cell, for example.

There have been conventionally proposed methods for diagnosis of deterioration of a NOx sensor. For example, There has been known a method by which to forcedly switch an applied voltage to the pump cell and diagnose the deterioration of the NOx sensor based on the amount of a change in the sensor cell output at that time.

SUMMARY

A present means is a gas sensor control device that is applied to a gas sensor having: a pump cell; and a sensor cell. The gas sensor control device includes: a voltage switching unit that performs a first voltage switching to increase the oxygen concentration in the gas chamber and a second voltage switching to decrease the oxygen concentration in the gas chamber after the execution of the first voltage switching; an output change calculation unit that calculates an output change parameter indicating a change in output of the sensor cell according to the voltage switching; a concentration difference calculation unit that calculates a concentration difference parameter indicating a concentration difference in the oxygen concentration or in the concentration of the specific gas in the detection target gas between before the execution of the first voltage switching and after the execution of the second voltage switching; and a deterioration determination unit that determines a deterioration state of the sensor cell based on the output change parameter and the concentration difference parameter.

BRIEF DESCRIPTION OF THE DRAWINGS

The foregoing and other objects, features, and advantages of the present disclosure will be more clarified by the following detailed descriptions with reference to the accompanying drawings. The drawings are as follows.

DETAILED DESCRIPTION OF THE PREFERRED EMBODIMENTS

Figure 1:
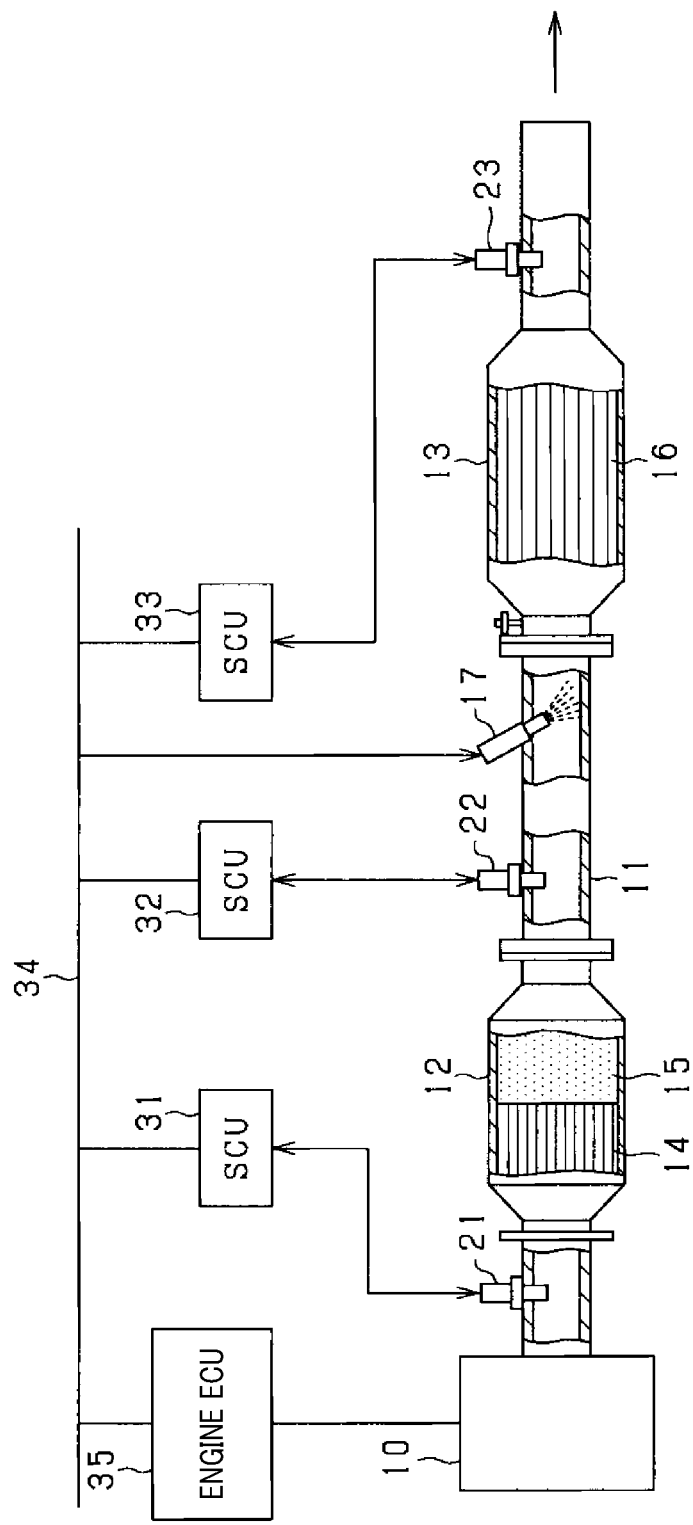
FIG. 1 is a diagram illustrating a system configuration of an engine exhaust system.

Hereinafter, embodiments will be described with reference to the drawings. In the present embodiments, in a system where exhaust gas emitted from an in-vehicle diesel engine is taken as detection target gas and NOx concentration in the exhaust gas is detected by a NOx sensor, a gas sensor control device is implemented to perform a control related to the NOx sensor. Identical or equivalent components in the following embodiments will be illustrated with the same reference signs in the drawings, and descriptions of the components with the same reference signs will be incorporated by reference.

The inventor of the present disclosure has studied a gas sensor control device that properly determines the deterioration state of the sensor cell.

As a gas sensor detecting the concentration of a specific gas component in a detection target gas such as exhaust gas from an internal combustion engine, there is known a NOx sensor detecting the concentration of NOx (nitrogen oxides). The NOx sensor has a three-cell structure formed from a pump cell, a monitor cell, and a sensor cell as described in JP 2009-175013 A, for example. The pump cell discharges or pumps the oxygen from the exhaust gas introduced into a gas chamber. The monitor cell detects the concentration of the residual oxygen in the gas chamber after passage through the pump cell. The sensor cell detects the NOx concentration of the gas after passage through the pump cell.

The deteriorated NOx sensor cannot accurately detect the NOx concentration. As a result, when the NOx sensor is installed in the exhaust system of an automobile, there is a possibility that the exhaust system suffers from a failure such as degraded exhaust emissions. Thus, there have been conventionally proposed methods for diagnosis of deterioration of a NOx sensor. For example, JP 2009-175013 A discloses a method by which to forcedly switch an applied voltage to the pump cell and diagnose the deterioration of the NOx sensor based on the amount of a change in the sensor cell output at that time.

According to the foregoing conventional deterioration diagnosis method, the concentration of the residual oxygen in the gas chamber is intentionally changed by switching the pump cell applied voltage and the deterioration diagnosis of the sensor cell is performed based on a transient response of the sensor cell along with a change in the residual oxygen concentration. However, if the oxygen concentration or the NOx concentration in the exhaust gas changes after the switching of the pump cell applied voltage, there may occur a change in the sensor cell output resulting from the concentration change. That is, an unintentional change may occur in the gas atmosphere around the sensor cell and the sensor cell may become affected by the change. In this case, it is considered that the deterioration diagnosis of the sensor cell may be adversely influenced.

The present disclosure is devised in light of the foregoing issues. A main object of the present disclosure is to provide a gas sensor control device that properly determines the deterioration state of the sensor cell.

To solve the foregoing issues, a present means is a gas sensor control device that is applied to a gas sensor having: a pump cell that adjusts an oxygen concentration in a detection target gas introduced into a gas chamber by application of a voltage; and a sensor cell that detects a concentration of a specific gas component from the detection target gas after the adjustment of the oxygen concentration by the pump cell, and that performs a control related to the gas sensor. The gas sensor control device includes: a voltage switching unit that performs a first voltage switching by which to switch an applied voltage to the pump cell to increase the oxygen concentration in the gas chamber and a second voltage switching by which to switch the applied voltage to decrease the oxygen concentration in the gas chamber after the execution of the first voltage switching; an output change calculation unit that, in at least one of a state having undergone the first voltage switching and a state having undergone the second voltage switching, calculates an output change parameter indicating a change in output of the sensor cell according to the voltage switching; a concentration difference calculation unit that calculates a concentration difference parameter indicating a concentration difference in the oxygen concentration or in the concentration of the specific gas in the detection target gas between before the execution of the first voltage switching and after the execution of the second voltage switching; and a deterioration determination unit that determines a deterioration state of the sensor cell based on the output change parameter calculated by the output change calculation unit and the concentration difference parameter calculated by the concentration difference calculation unit.

In the foregoing configuration, at the deterioration determination of the sensor cell, when the applied voltage to the pump cell is switched to increase the oxygen concentration in the gas chamber as the first voltage switching or when the applied voltage to the pump cell is switched to decrease the oxygen concentration in the gas chamber as the second voltage switching, there occurs a transient change in the output of the sensor cell according to the voltage switching. This makes it possible to determine the deterioration state of the sensor cell using the output change parameter indicating the change in the output of the sensor cell. However, when the oxygen concentration or the concentration of the specific gas component in the detection target gas fluctuates in a period during which there occurs a change in the output of the sensor cell, the deterioration determination of the sensor cell to be performed based on the output change parameter for the sensor cell may be adversely influenced by the fluctuation.

In this respect, according to the foregoing configuration, the concentration difference parameter indicating the concentration difference in the oxygen concentration or the concentration of the specific gas component in the detection target gas between before the execution of the first voltage switching and after the execution of the second voltage switching is calculated, and the deterioration state of the sensor cell is determined based on the output change parameter for the sensor cell and the concentration difference parameter. This makes it possible to properly determine the deterioration state of the sensor cell even if the oxygen concentration or the concentration of the specific gas component (NOx concentration) in the detection target gas fluctuates in the period from the first voltage switching to the second voltage switching.

First Embodiment

As illustrated in FIG. 1, an exhaust purification system is provided on the exhaust side of an engine 10 as a diesel engine to purify the exhaust gas. The exhaust purification system is configured such that the engine 10 connects to an exhaust pipe 11 constituting an exhaust path, and the exhaust pipe 11 is provided with an oxidation catalytic converter 12 and a selective catalytic reduction converter (hereinafter, called SCR catalytic converter) 13 in this order from the engine 10 side. The oxidation catalytic converter 12 has a diesel oxidation catalyst 14 and a diesel particulate filter (DPF) 15. The SCR catalytic converter 13 has an SCR catalyst 16 as a selective reduction catalyst. The exhaust pipe 11 is provided with an aqueous urea additive valve 17 to add and supply aqueous urea (aqueous solution of urea) as a reducing agent into the exhaust pipe 11 between the oxidation catalytic converter 12 and the SCR catalytic converter 13.

In the oxidation catalytic converter 12, the diesel oxidation catalyst 14 is mainly made from a ceramic carrier, an oxide mixture containing aluminum oxide, cerium dioxide, and zirconium dioxide as the main ingredients, and a noble metal catalyst such as platinum, palladium, or rhodium. The diesel oxidation catalyst 14 oxides and purifies hydrocarbon, carbon monoxide, nitrogen oxide, and others included in the exhaust gas. The diesel oxidation catalyst 14 also raises the exhaust temperature by generating heat at the time of catalytic reaction.

The DPF 15 is formed from a honeycomb structure in which a platinum group catalyst such as platinum or palladium is supported in porous ceramics. The DPF 15 collects particulate substances included in the exhaust gas by accumulating them on partition walls of the honeycomb structure. The accumulated particulate substances are oxidized and purified by combustion. The combustion is performed by using the temperature rise of the diesel oxidation catalyst 14 and the combustion temperature decrease of the particulate substances caused by an additive agent.

The SCR catalytic converter 13 is a post-processing device of the oxidation catalytic converter 12 that reduces NOx into nitrogen and water. The SCR catalyst 16 is, for example, a catalyst in which a noble metal such as Pt is supported on the surface of a base material such as zeolite or alumina. When the catalyst temperature is in an active temperature range, the SCR catalyst 16 reduces and purifies NOx with the addition of urea as a reducing agent.

The exhaust pipe 11 is provided with limiting current NOx sensors 21, 22, and 23 as gas sensors, respectively upstream of the oxidation catalytic converter 12, upstream of the aqueous urea additive valve 17 between the oxidation catalytic converter 12 and the SCR catalytic converter 13, and downstream of the SCR catalytic converter 13. The NOx sensors 21 to 23 detect the NOx concentration in the exhaust gas at their respective detection positions. The positions and number of the NOx sensors in the engine exhaust system can be set arbitrarily.

The NOx sensors 21 to 23 are respectively connected to sensor control units (SCUs) 31, 32, and 33. Detection signals from the NOx sensors 21 to 23 are output to the corresponding SCUs 31 to 33 as appropriate. The SCUs 31 to 33 are electronic control devices that each include a microcomputer having a CPU and various memories and its peripheral circuits, and calculate the oxygen ($O_2$) concentration and the NOx concentration as the concentration of a specific gas component in the exhaust gas, based on the detection signals (limit current signals) from the NOx sensors 21 to 23.

The SCUs 31 to 33 are connected to various ECUs (for example, the engine ECU 35) via a communication line 34. That is, the SCUs 31 to 33 and the engine ECU 35 can mutually transmit and receive information using the communication line 34. For example, the SCUs 31 to 33 transmit information on the oxygen concentration and the NOx concentration in the exhaust gas to the engine ECU 35. The engine ECU 35 is an electronic control device including a microcomputer having a CPU and various memories and its peripheral circuits, which controls the engine 10 and various devices in the exhaust system. The engine ECU 35 performs a fuel injection control and others based on an accelerator opening and engine rotation speed, for example.

In addition, the engine ECU 35 controls the addition of aqueous urea using the aqueous urea additive valve 17 based on the NOx concentration detected by the NOx sensors 21 to 23. The control of addition of aqueous urea will be briefly described. The engine ECU 35 calculates the additive amount of aqueous urea based on the NOx concentration detected by the NOx sensors 21 and 22 upstream of the SCR catalytic converter 13, and performs feedback correction on the additive amount of aqueous urea such that the value of the NOx concentration detected by the NOx sensor 23 downstream of the SCR catalytic converter 13 becomes as small as possible. Then, the engine ECU 35 controls driving of the aqueous urea additive valve 17 based on the additive amount of aqueous urea.

Figure 2:
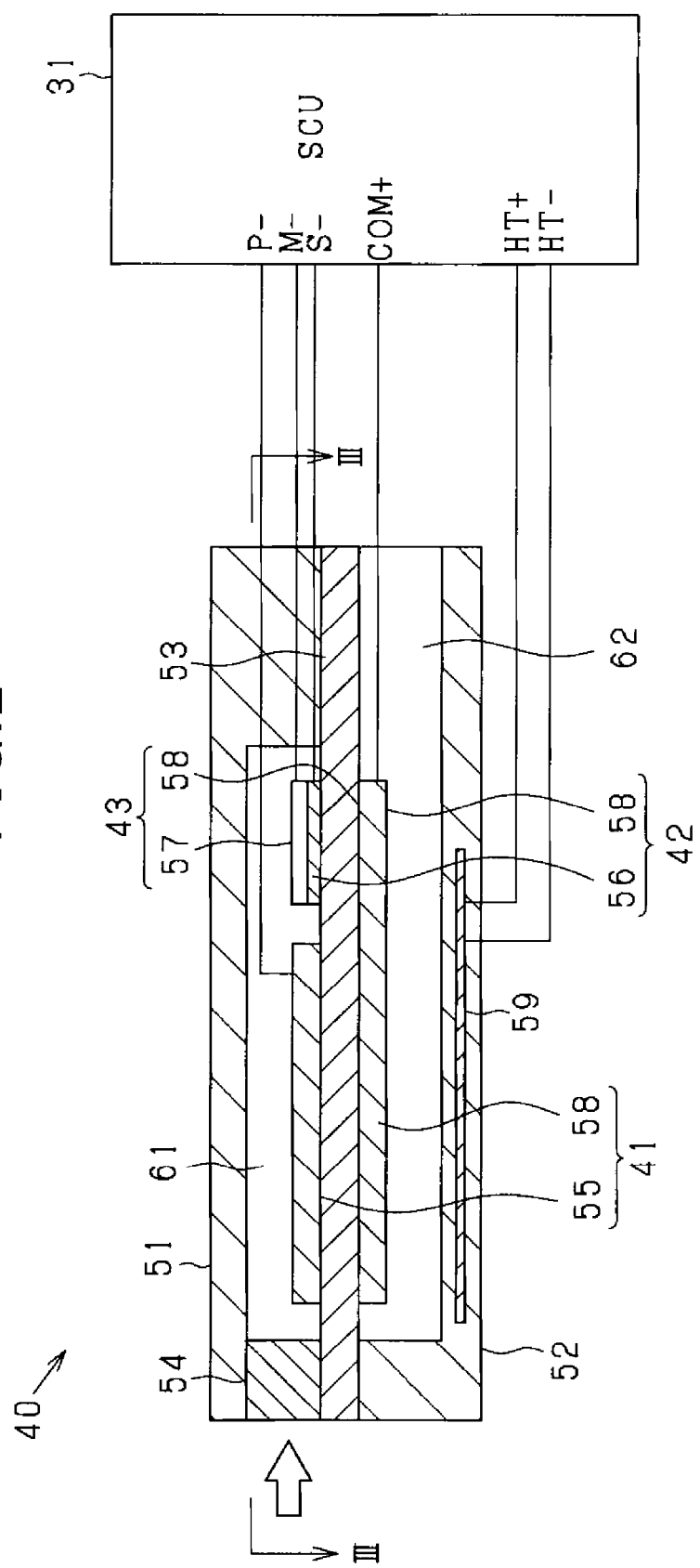
FIG. 2 is a cross-sectional view of a configuration of a NOx sensor.
Figure 3:
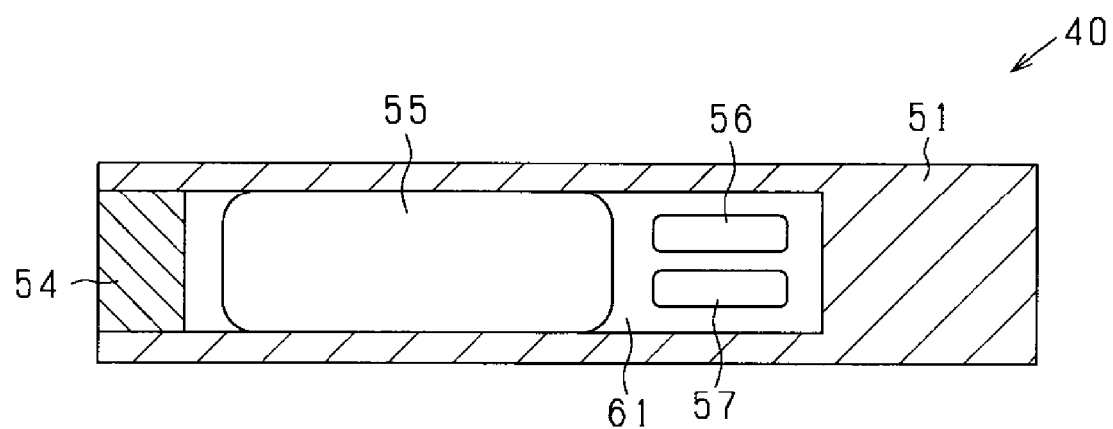
FIG. 3 is a cross-sectional view of FIG. 2 taken along line III-III.

Next, a configuration of the NOx sensors 21 to 23 will be described. The NOx sensors 21 to 23 are the same in configuration, and thus the configuration of the NOx sensor 21 will be described here. FIGS. 2 and 3 are diagrams illustrating an internal structure of a sensor element 40 constituting the NOx sensor 21. The longer side of the sensor element 40 extends along the right-left direction in the drawing, and the front end of the sensor element 40 is on the left side of the drawing. The sensor element 40 has a three-cell structure including a pump cell 41, a sensor cell 42, and a monitor cell 43. The monitor cell 43 has the function of discharging oxygen from a gas as well as the pump cell 41, and can also be called an auxiliary pump cell or second pump cell.

The sensor element 40 includes a first main body part 51 and a second main body part 52 made of an insulator such as alumina, a solid electrolyte body 53 interposed between the main body parts 51 and 52, a diffused resistor 54, a pump cell electrode 55, a sensor cell electrode 56, a monitor cell electrode 57, a common electrode 58, and a heater 59. A gas chamber 61 as a concentration measurement chamber is formed between the first main body part 51 and the solid electrolyte body 53, and an air chamber 62 as a standard gas chamber is formed between the second main body part 52 and the solid electrolyte body 53.

The pump cell 41 adjusts the oxygen concentration in the exhaust gas introduced into the gas chamber 61 and is formed from the pump cell electrode 55, the common electrode 58, and part of the solid electrolyte body 53. The sensor cell 42 detects the concentration of a predetermined gas component (NOx concentration) in the gas chamber 61 based on an oxygen ion current flowing between the sensor cell electrode 56 and the common electrode 58, and is formed from the sensor cell electrode 56, the common electrode 58, and part of the solid electrolyte body 53. The monitor cell 43 detects the concentration of the residual oxygen in the gas chamber 61 based on an oxygen ion current flowing between the monitor cell electrode 57 and the common electrode 58, and is formed from the monitor cell electrode 57, the common electrode 58, and part of the solid electrolyte body 53.

The solid electrolyte body 53 is a plate-like member that is formed by an oxygen ion conductive solid electrolyte material such as zirconia oxide. The first main body part 51 and the second main body part 52 are arranged on the both sides of the solid electrolyte body 53. The first main body part 51 is stepped on the solid electrolyte body 53 side, and the step forms a concave portion that constitutes the gas chamber 61. One side surface of the concave portion in the first main body part 51 is opened, and the diffused resistor 54 is arranged on the one opened side surface. The diffused resistor 54 is made from a porous material or a material with fine pores. The speed of the exhaust gas introduced into the gas chamber 61 is regulated by the action of the diffused resistor 54.

Similarly, the second main body part 52 is stepped on the solid electrolyte body 53 side, and the step forms a concave portion that constitutes the air chamber 62. One side surface of the air chamber 62 is opened. The gas introduced from the solid electrolyte body 53 side into the air chamber 62 is released to the atmosphere.

The cathode-side pump cell electrode 55, sensor cell electrode 56, and monitor cell electrode 57 are provided on the surface of the solid electrolyte body 53 facing the gas chamber 61. In this case, the pump cell electrode 55 is arranged on the entrance side of the gas chamber 61 near the diffused resistor 54, that is, upstream of the gas chamber 61. The sensor cell electrode 56 and the monitor cell electrode 57 are arranged on the opposite side of the diffused resistor 54 with the pump cell electrode 55 therebetween, that is, downstream of the gas chamber 61. The pump cell electrode 55 has a surface area larger than those of the sensor cell electrode 56 and the monitor cell electrode 57. The sensor cell electrode 56 and the monitor cell electrode 57 are arranged at positions that are in proximity to each other and are equal with respect to the flowing direction of the exhaust gas. The pump cell electrode 55 and the monitor cell electrode 57 are electrodes made of a noble metal inactive to NOx such as Au—Pt (electrodes less capable of decomposing NOx), whereas the sensor cell electrode 56 is an electrode made of a noble metal active to NOx such as platinum Pt or rhodium Rh.

The anode-side common electrode 58 is provided on the surface of the solid electrolyte body 53 facing the air chamber 62 at a position corresponding to the cathode-side electrodes 55 to 57.

When a voltage is applied between the pump cell electrode 55 and the common electrode 58, the oxygen contained in the exhaust gas in the gas chamber 61 is ionized by the cathode-side pump cell electrode 55. Then, the oxygen ions move in the solid electrolyte body 53 toward the anode-side common electrode 58, and the oxygen ions in the common electrode 58 release electric charge and turn into oxygen. The oxygen is discharged into the air chamber 62. Accordingly, the gas chamber 61 is held in a predetermined low-oxygen state.

As the applied voltage to the pump cell 41 (that is, the applied voltage between the pump cell electrode 55 and the common electrode 58) is higher, the amount of oxygen discharged from the exhaust gas by the pump cell 41 becomes larger. In reverse, as the applied voltage to the pump cell 41 is lower, the amount of oxygen discharged from the exhaust gas by the pump cell 41 becomes smaller. Therefore, increasing or decreasing the applied voltage to the pump cell 41 makes it possible to increase or decrease the amount of the residual oxygen in the exhaust gas flowing into the following sensor cell 42 and monitor cell 43. In the present embodiment, the voltage applied to the pump cell 41 is designated as pump cell applied voltage Vp, and the current output from the pump cell 41 in the voltage applied state is designated as pump cell current Ip.

The monitor cell 43 detects the concentration of the residual oxygen in the gas chamber 61 after the oxygen is discharged by the pump cell 41. At this time, as a detection signal of the residual oxygen concentration, the monitor cell 43 outputs a current signal generated resulting from the voltage application or an electromotive signal according to the residual oxygen concentration in the gas chamber 61. The output of the monitor cell 43 is acquired as a monitor cell current Inn or a monitor cell electromotive force Vm by the SCUs 31 to 33.

After the oxygen is discharged by the pump cell 41, the sensor cell 42 subjects the NOx in the exhaust gas to reductive decomposition along with the voltage application, and outputs a current signal according to the NOx concentration and the residual oxygen concentration in the gas chamber 61. The output of the sensor cell 42 is acquired as sensor cell current Is by the SCUs 31 to 33. The SCUs 31 to 33 calculate the NOx concentration in the exhaust gas by the sensor cell current Is.

Figure 4:
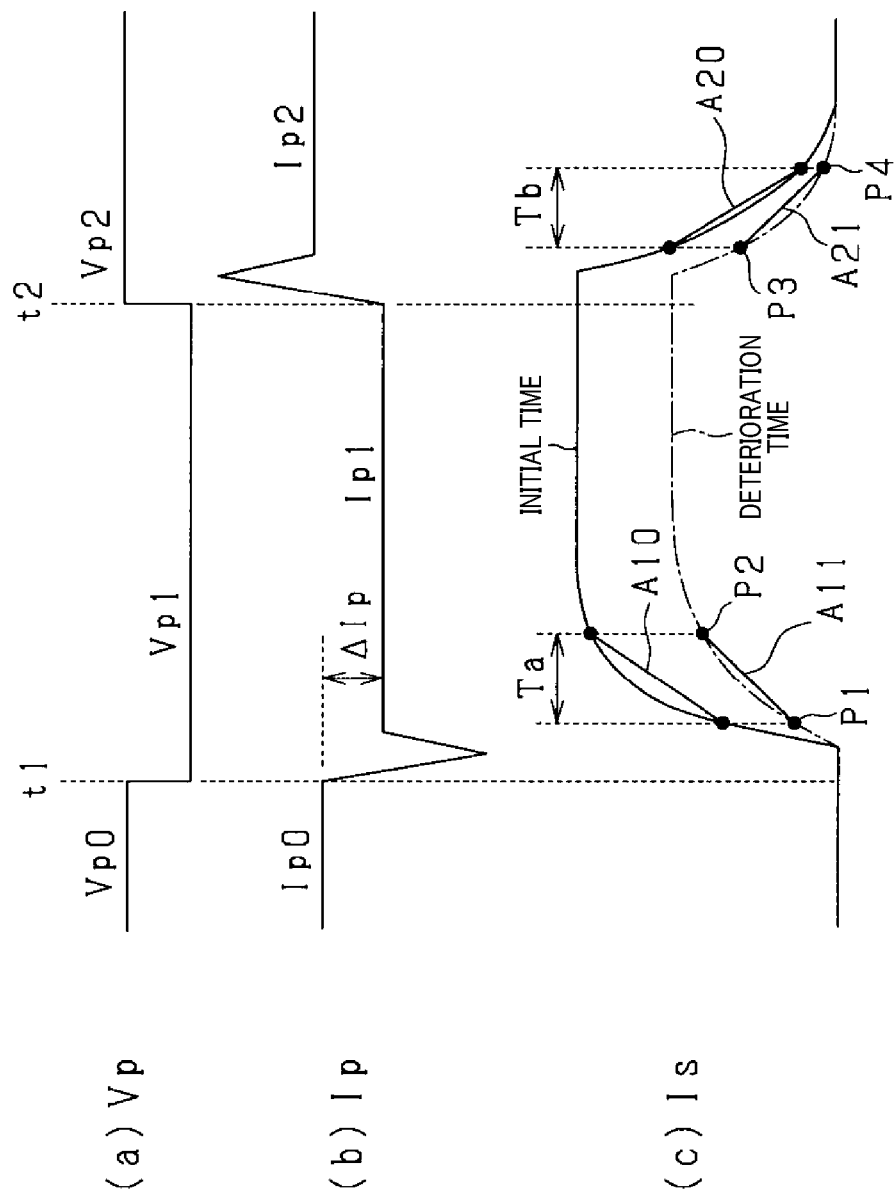
FIG. 4 is a diagram for describing changes in transient characteristics of output of a sensor cell due to deterioration of the NOx sensor.

In the sensor cell 42, even when the concentration of the detection target gas in the exhaust gas is the same, the transient responsiveness of the sensor cell current Is as output of the sensor cell 42 tends to vary under influence of deterioration with time or the like. This tendency will be described with reference to FIG. 4. FIG. 4 schematically illustrates with time transitions with time of (a) the pump cell applied voltage Vp, (b) the pump cell current Ip, and (c) the sensor cell current Is. Hereinafter, description will be given as to the case of performing a first voltage switching in which to switch the pump cell applied voltage Vp to increase the residual oxygen concentration in the gas chamber 61 and a second voltage switching in which to switch the pump cell applied voltage Vp to decrease the residual oxygen concentration in the gas chamber 61 after the execution of the first voltage switching.

Referring to FIG. 4, at time t1, the pump cell applied voltage Vp is switched in a stepped manner from Vp0 to Vp1 as the first voltage switching (Vp0>Vp1). Accordingly, the pump cell current Ip changes and decreases, thereby to increase the residual oxygen concentration in the gas chamber 61. At that time, the pump cell current Ip changes with tailing from Ip0 and converges on Ip1. In the sensor cell 42, the sensor cell current Is increases to a steady-state value through a transient response according to the increase in the residual oxygen concentration.

FIG. 4(c) illustrates two types of transient response characteristics of the sensor cell current Is according to the decrease in the pump cell applied voltage Vp, that is, the characteristics at the time of manufacture of the NOx sensor (initial characteristics) and the characteristics with the NOx sensor deteriorated (post-deterioration characteristics). In FIG. 4(c), the initial characteristics are shown by a solid line and the deterioration-time characteristics are shown by a one-dot chain line. FIG. 4(c) indicates that there occurs a difference between the initial characteristics and the deterioration-time characteristics of the sensor cell current Is even in a case where the exhaust gas supplied to the sensor cell 42 has the same oxygen concentration. In this case, first, the steady-state value of the deterioration-time characteristics tends to be smaller than the steady-state value of the initial characteristics. Secondly, the rising of the deterioration-time characteristics tends to be slower than the rising of the initial characteristics. For example, with regard to gradients of the characteristics in a period Ta during a transient change, a gradient A11 of the deterioration-time characteristics is lesser than a gradient A10 of the initial characteristics. The period Ta refers to a period of time between a start point P1 and an end point P2 of the transient response to the switching of the pump cell applied voltage Vp. These tendencies become more prominent along with the progress of deterioration of the sensor cell 42.

Referring to FIG. 4, at time t2, the pump cell applied voltage Vp is switched in a stepped manner from Vp1 to Vp2 as the second voltage switching (Vp1<Vp2). Accordingly, the pump cell current Ip changes to increase, thereby to reduce the residual oxygen concentration in the gas chamber 61. At this time, the pump cell current Ip changes while tailing from Ip1 and converges on Ip2. In the sensor cell 42, the sensor cell current Is decreases to a steady-state value through a transient response according to the reduction in the residual oxygen concentration. Also, at the execution of the second voltage switching, there occurs a difference between the initial characteristics and the deterioration-time characteristics of the sensor cell current Is. In this case, with regard to gradients of the characteristics in a period Tb during the transient change, for example, a gradient A21 of the deterioration-time characteristics is less than a gradient A20 of the initial characteristics. The period Tb is a period of time between a start point P3 and an end point P4 of the transient response to the switching of the pump cell applied voltage Vp.

At the execution of the first voltage switching, the start point P1 and the end point P2 refer to timings included in a predetermined period after the switching of the pump cell applied voltage Vp and before the stabilization of the sensor cell current Is. The timings set as the start point P1 and the end point P2 will be described below.

Figure 5:
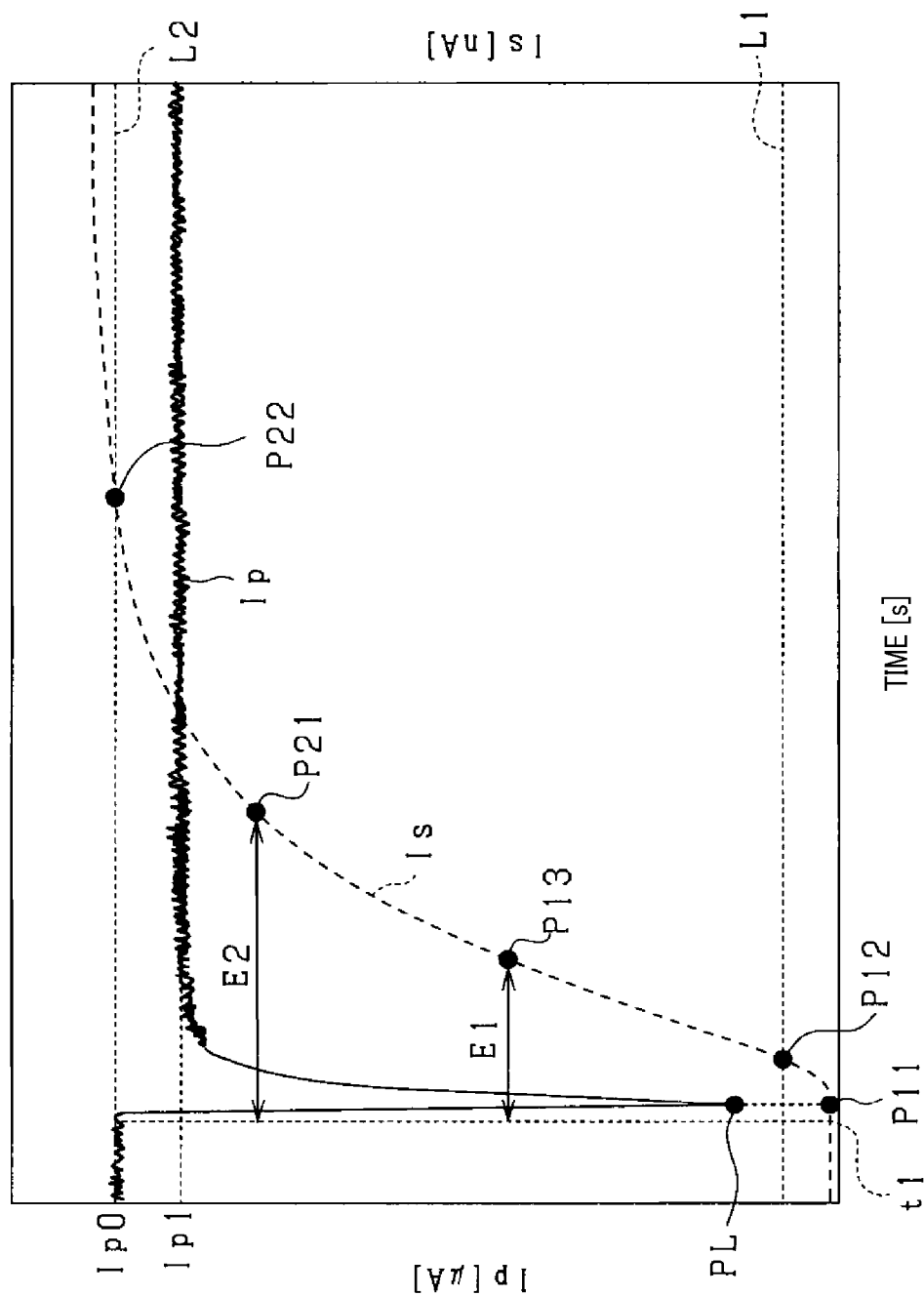
FIG. 5 is a diagram illustrating a start point and an end point for use in the calculation of a gradient parameter.

As illustrated in FIG. 5, the start point P1 is, for example, any of the following three points:

(a1) a timing with which the tailing of the pump cell current Ip caused by the switching of the pump cell applied voltage Vp reaches a tailing lowest point PL (a point P11 illustrated in FIG. 5);

(a2) a timing with which a sensor cell output fluctuation amount caused by the switching of the pump cell applied voltage Vp reaches a predetermined value L1 (a point P12 illustrated in FIG. 5); and (a3) a timing with which a predetermined time E1 elapses after the switching of the pump cell applied voltage Vp (a point P13 illustrated in FIG. 5).

As illustrated in FIG. 5, the end point P2 is, for example, any of the following two points:

(a4) a timing with which a predetermined time E2 elapses after the switching of the pump cell applied voltage Vp (a point P21 illustrated in FIG. 5); and (a5) a timing with which the sensor cell output fluctuation amount caused by the switching of the pump cell applied voltage Vp reaches a predetermined value L2 (a point P22 illustrated in FIG. 5).

The predetermined value L1 is a value obtained by increasing the current value before the voltage switching by a predetermined percent (for example, any of 5 to 30%) where the current change amount of the sensor cell current Is is set to 100% at the time of switching of the pump cell applied voltage Vp (switching from Vp0 to Vp1) in the same manner as this time in the initial states of the NOx sensors 21 to 23. The predetermined value L2 is larger than the predetermined value L1, which is obtained by increasing the current value before the voltage switching by a predetermined percent (for example, any of 50 to 95%).

In consideration of early execution of the deterioration determination, both the start point P1 and the end point P2 are preferably set with as early timings as possible. In the foregoing specific examples (a1) to (a5), it is preferred to set the start point P1 to (a1) and set the end point P2 to (a4).

At the execution of the second voltage switching, the start point P3 and the end point P4 are timings included in a predetermined period after the switching of the pump cell applied voltage Vp and before the stabilization of the sensor cell current Is. The start point P3 and the end point P4 are set as described below. The setting method is similar to the setting method for the start point P1 and the end point P2, and thus will be briefly described below.

The start point P3 is, for example, any of the following three points:

(b1) a timing with which the tailing of the pump cell current Ip caused by the switching of the pump cell applied voltage Vp reaches a tailing highest point;

(b2) a timing with which the sensor cell output fluctuation amount caused by the switching of the pump cell applied voltage Vp reaches a predetermined value L3; and (b3) a timing with which a predetermined time E3 elapses after the switching of the pump cell applied voltage Vp.

The end point P2 is, for example, any of the following two points:

(b4) a timing with which a predetermined time E4 elapses after the switching of the pump cell applied voltage Vp; and (b5) a timing with which the sensor cell output fluctuation amount caused by the switching of the pump cell applied voltage Vp reaches a predetermined value L4.

As with the predetermined values L1 and L2, the predetermined values L3 and L4 are preferably determined at predetermined percent with reference to the current change amount of the sensor cell current Is at the execution of the switching of the pump cell applied voltage Vp (Vp1 to Vp2) in the same manner as this time in the initial states of the NOx sensors 21 to 23 (however, L3>L4).

At the execution of the deterioration determination of the sensor cell 42, the residual oxygen concentration in the gas chamber 61 changes due to the switching of the pump cell applied voltage Vp, and the deterioration determination of the sensor cell 42 is performed based on the transient response of the sensor cell 42 to the change in the residual oxygen concentration. However, after the switching of the pump cell applied voltage Vp, if the oxygen concentration or the NOx concentration in the exhaust gas changes, for example, the sensor cell current Is also changes according to the concentration change. That is, the gas atmosphere around the sensor cell 42 changes unintentionally, which may exert influence on the sensor cell 42. In this case, the deterioration determination of the sensor cell 42 may be adversely affected. Referring to FIG. 4, for example, if the oxygen concentration in the exhaust gas increases after the switching of the pump cell applied voltage Vp (after time t1), the change amount of the sensor cell current Is may become larger under the influence of the increase, thereby to reduce the detection accuracy of the sensor cell current Is as a parameter for the deterioration determination.

Thus, in the present embodiment, the difference in the oxygen concentration in the exhaust gas (that is, concentration change amount) between before the execution of the first voltage switching and after the execution of the second voltage switching is calculated, and the deterioration state of the sensor cell 42 is determined using the concentration difference, thereby to suppress reduction in the accuracy of the deterioration determination of the sensor cell 42.

Figure 6:
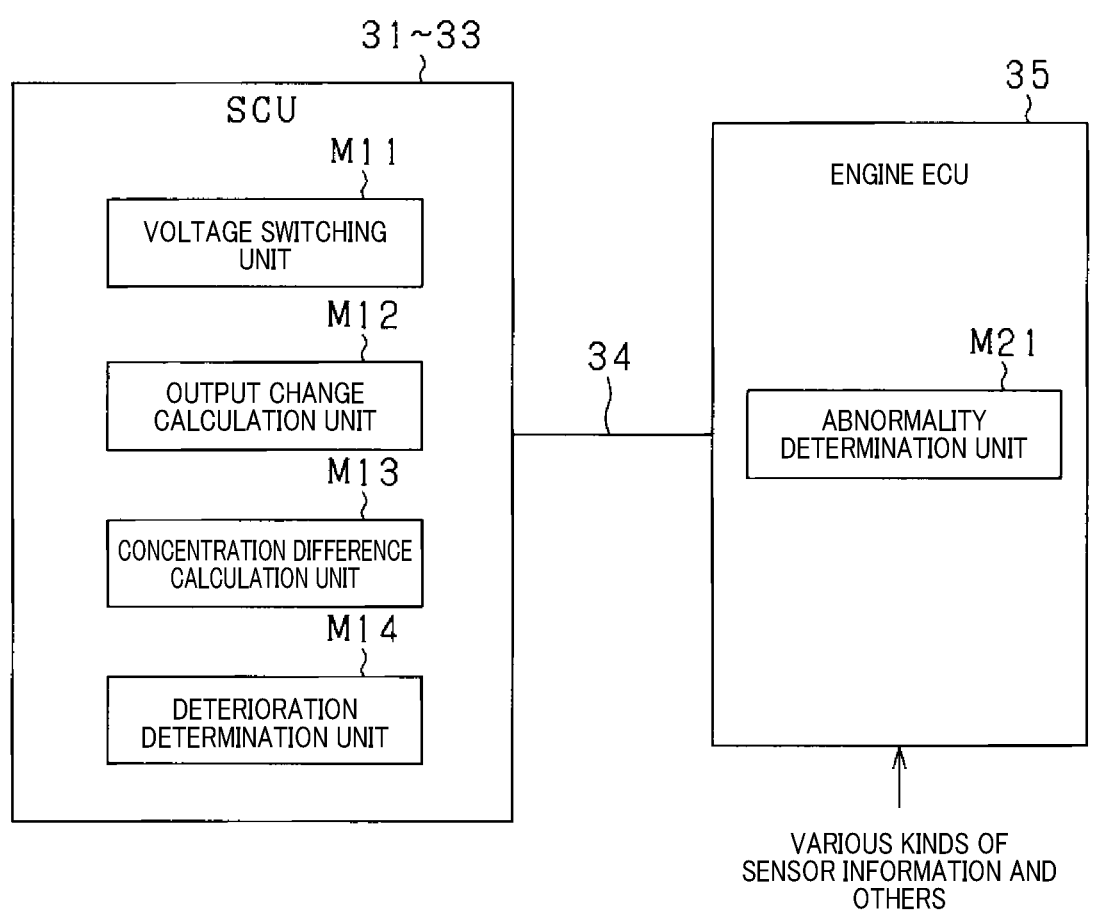
FIG. 6 is a functional block diagram of an SCU and an ECU.

FIG. 6 is a functional block diagram for describing the functions of the SCUs 31 to 33. Each of the SCUs 31 to 33 includes: a voltage switching unit M11 that executes the first voltage switching and the second voltage witching as switching of the pump cell applied voltage Vp; an output change calculation unit M12 that calculates an output change parameter indicating a change in output of the sensor cell 42 according to the voltage switching in at least one of the state in which the first voltage switching is performed by the voltage switching unit M11 and the state in which the second voltage switching is performed by the voltage switching unit M11; a concentration difference calculation unit M13 that calculates a concentration difference parameter indicating a difference in the oxygen concentration in the exhaust gas between before the execution of the first voltage switching and after the execution of the second voltage switching; and a deterioration determination unit M14 that determines the deterioration state of the sensor cell 42 based on the output change parameter calculated by the output change calculation unit M12 and the concentration difference parameter calculated by the concentration difference calculation unit M13.

The voltage switching unit M11 performs the first voltage switching in which to switch the pump cell applied voltage Vp to increase the oxygen concentration in the gas chamber 61 (the voltage switching from Vp0 to Vp1 illustrated in FIG. 4) and the second voltage switching in which to switch the pump cell applied voltage Vp to decrease the oxygen concentration in the gas chamber 61 (the voltage switching from Vp1 to Vp2 illustrated in FIG. 4). That is, the voltage switching unit M11 performs a voltage switching cycle of decreasing and then increasing the pump cell applied voltage Vp. In the present embodiment, the pump cell applied voltage Vp is switched in a stepped manner. However, the voltage change waveform may be different from a stepped waveform. Nevertheless, the voltage change waveform is preferably the same as that at the time of measurement of the initial characteristics because the deterioration determination is performed by comparison with the initial characteristics.

The output change calculation unit M12 calculates the gradient of the sensor cell current Is during a transient change due to the switching of the pump cell applied voltage Vp by the voltage switching unit M11 (A11 or A21 illustrated in FIG. 4). Specifically, as the output change parameter, the output change calculation unit M12 calculates the gradient of the transient change from a change amount ΔIs of the sensor cell current Is per a unit time Δt during the transient change of the sensor cell current Is. In the present embodiment, as the output change parameter, between the first voltage switching (the voltage switching from Vp0 to Vp1 illustrated in FIG. 4) and the second voltage switching (the voltage switching from Vp1 to Vp2 illustrated in FIG. 4), the output change calculation unit M12 calculates the gradient of the sensor cell current Is during the transient change due to the execution of the first voltage switching (A11 illustrated in FIG. 4).

The concentration difference calculation unit M13 calculates the change amount of the oxygen concentration in the exhaust gas in the voltage switching cycle. As the concentration difference parameter, the concentration difference calculation unit M13 calculates a pump cell output difference ΔIpx as a difference between the pump cell current Ip0 before the execution of the first voltage switching and the pump cell current Ip2 after the execution of the second voltage switching.

As the deterioration determination process of the sensor cell 42, the deterioration determination unit M14 basically determines the deterioration state of the sensor cell 42 based on the gradient of the sensor cell current Is during a transient change. In the present embodiment, the deterioration determination unit M14 calculates a deterioration rate C of the sensor cell 42 based on the gradient of transient response of the sensor cell current Is calculated by the output change calculation unit M12 and the pump cell output difference ΔIpx calculated by the concentration difference calculation unit M13, and determines the deterioration state by the deterioration rate C.

In the present embodiment, in particular, the deterioration determination unit M14 determines whether the deterioration determination of the sensor cell 42 is valid based on the pump cell output difference ΔIpx calculated by the concentration difference calculation unit M13. Specifically, when the pump cell output difference ΔIpx is smaller than a predetermined value, the deterioration determination unit M14 determines that the deterioration determination of the sensor cell 42 is valid, and when the pump cell output difference ΔIpx is equal to or greater than the predetermined value, the deterioration determination unit M14 determines that the deterioration determination of the sensor cell 42 is invalid. When determining that the deterioration determination of the sensor cell 42 is invalid, the deterioration determination unit M14 causes the voltage switching unit M11 to perform again the first voltage switching and the second voltage switching. Then, the deterioration determination unit M14 determines again the deterioration state of the sensor cell 42, based on the output change parameter calculated by the output change calculation unit M12 and the concentration difference parameter calculated by the concentration difference calculation unit M13 at the re-switching of the voltage.

The sensor cell 42 detects the sensor cell current Is in an nA order level at the time of the general NOx concentration detection, but detects the sensor cell current Is in a μA order level due to the residual oxygen concentration at the time of switching of the pump cell applied voltage Vp for the deterioration determination. In either case, the A/D conversion current processing range in the SCUs 31 to 33 is preferably switched between the time of NOx concentration detection and the time of deterioration determination. At the time of deterioration determination, the current processing range is preferably extended as compared with that at the time of NOx concentration detection.

The engine ECU 35 has an abnormality determination unit M21 that determines an abnormality due to emission degradation based on the results of the deterioration determination by the SCUs 31 to 33. The abnormality determination unit M21 determines an engine emission abnormality based on the deterioration rate C of the sensor cell 42 calculated by the deterioration determination units M14 of the SCUs 31 to 33. The abnormality determination unit M21 may be configured to determine an emission abnormality not only based on the deterioration rate C of the sensor cell 42 but also in comprehensive consideration of the outputs of the NOx sensors 21 to 23, various kinds of sensor information from other sensors, the engine operating state, and others.

The deterioration determination related to the NOx sensors 21 to 23 and the emission abnormality determination may be both performed by the SCUs 31 to 33 or by the engine ECU 35. The emission abnormality determination is preferably performed by the engine ECU 35 because the emission abnormality determination is desirably performed using elements other than the degrees of deterioration of the NOx sensors 21 to 23.

Figure 7:
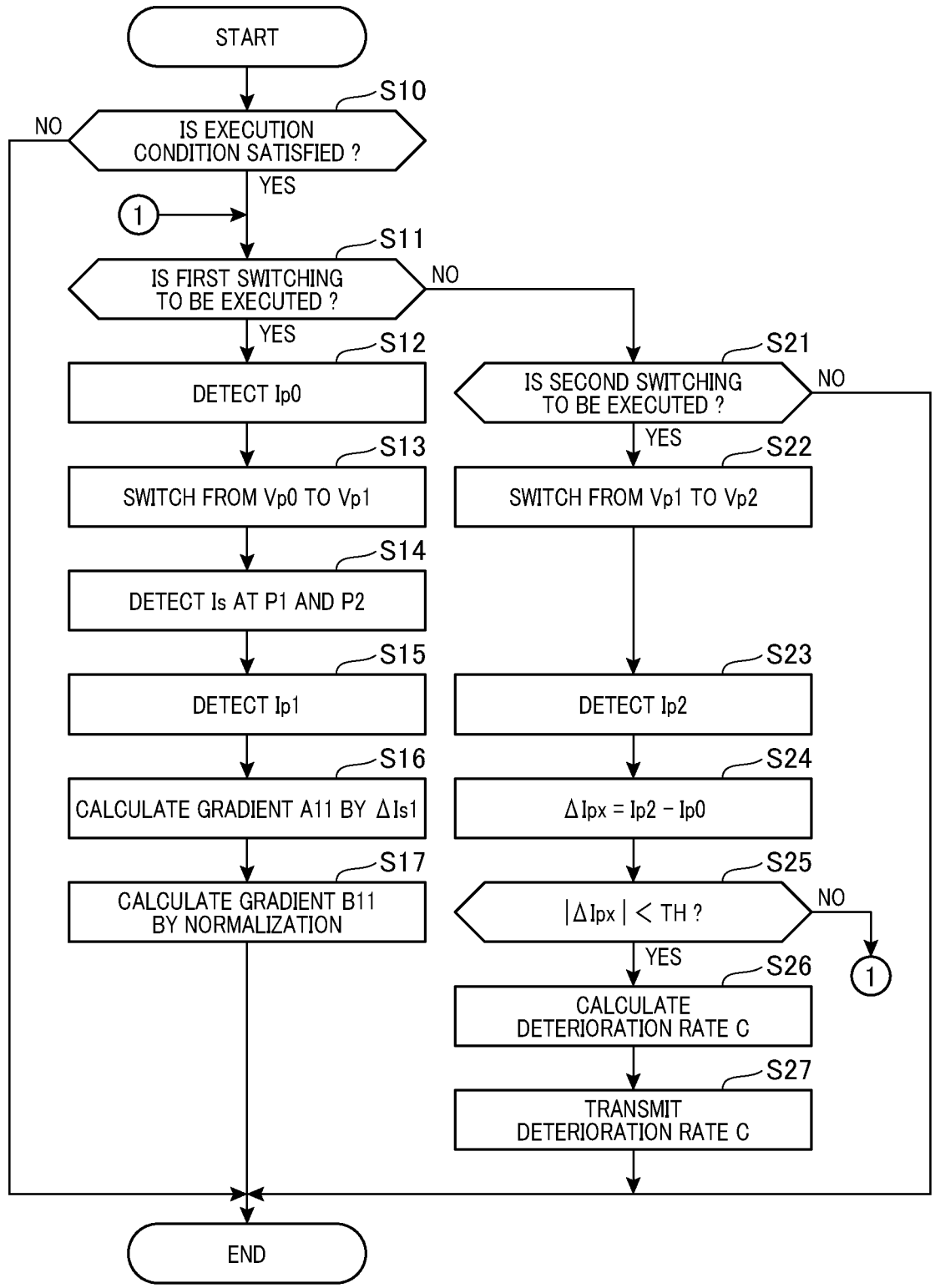
FIG. 7 is a flowchart of a process for deterioration determination of the sensor cell.

Next, a process for deterioration determination of the sensor cell 42 will be described with reference to the flowchart illustrated in FIG. 7. The process illustrated in FIG. 7 is arithmetic processing for implementing the functions of the SCUs 31 to 33 described in FIG. 6, which is performed by the SCUs 31 to 33 in each predetermined cycle, for example.

In step S10, each of the SCUs determines whether a condition for executing the deterioration determination is satisfied. The execution condition includes, for example, the receipt of a permission signal for permitting the execution of the deterioration determination from the engine ECU 35. The engine ECU 35 transmits the permission signal when the gas environment in the exhaust pipe 11 is a predetermined stable environment. Specifically, the engine ECU 35 transmits the permission signal when the engine 10 is in a predetermined operating state with a relatively stable emission amount, or when a fuel is cut, or immediately after the ignition switch is turned off (immediately after IG turn-off), or when the engine ECU 35 is being started by a soak timer. In particular, the execution condition is desirably set to the time immediately after the IG turn-off. This is because, immediately after the IG turn-off, the flow of the exhaust gas stops due to the stop of the engine, and the deterioration determination can be executed in the stable gas environment. When the condition for executing the deterioration determination is satisfied, the SCU moves to next step S11. When the condition for executing the deterioration determination is not satisfied, the SCU terminates this process.

In step S11, the SCU determines whether to perform the first voltage switching, that is, the switching of the pump cell applied voltage Vp to increase the residual oxygen concentration in the gas chamber 61. At this time, each of the SCUs 31 to 33 determines whether the oxygen concentration and the NOx concentration in the exhaust gas are in a stable state in which the fluctuation amounts per unit time are equal to or smaller than predetermined values. On the condition that these concentrations are in a stable state, the SCU permits the execution of the first voltage switching. Specifically, the SCU determines whether the fluctuation amount of the pump cell current Ip per unit time is equal to or smaller than a predetermined value and the fluctuation amount of the sensor cell current Is per unit time is equal to or smaller than a predetermined value before the execution of the first voltage switching. When these concentrations are in a stable state, the SCU makes an affirmative determination in step S11 and moves to next step S12. However, the process of determination on the concentration stability may be omitted.

Each of the SCUs 31 to 33 may determine whether either the oxygen concentration or the NOx concentration in the exhaust gas is in a stable state in which the fluctuation amount per unit time is equal to or smaller than a predetermined value. In this case, when the oxygen concentration in the exhaust gas is in a stable state, or when the NOx concentration in the exhaust gas is in a stable state, the SCU permits the execution of the first voltage switching. When the exhaust pipe 11 is provided with an A/F sensor, the SCU may determine whether the oxygen concentration in the exhaust gas is in a stable state based on the detection value from the A/F sensor.

Alternatively, the SCU may permit the execution of the first voltage switching on the condition that the oxygen concentration in the exhaust gas is within a predetermined concentration range or the NOx concentration in the exhaust gas is within a predetermined concentration range. In this case, instead of or in addition to the determination whether the oxygen concentration or the NOx concentration in the exhaust gas is stable, the SCU preferably performs a determination on whether the oxygen concentration or the NOx concentration is within a predetermined concentration range.

In step S11, in addition to the foregoing conditions, the SCU may permit the execution of the first voltage switching on the condition that there is no failure history (dialog information) related to the engine exhaust system or on the condition that the power voltage (battery voltage) is equal to or greater than a predetermined value. When the power voltage is lower than a predetermined value, the current distribution to the sensor heater will become insufficient so that the NOx sensors 21 to 23 cannot be maintained in a proper active state, thereby leading to reduction in the accuracy of deterioration determination.

In the case of executing the deterioration determination immediately after the IG turn-off, the SCUs 31 to 33 preferably start to acquire the detection signals from the NOx sensors 21 to 23 with the timing of receipt of the engine stop signal from the engine ECU 35 before the receipt of the permission signal from the engine ECU 35. In this case, instantaneously acquiring the sensor detection signals enables early determination on whether the oxygen concentration in the exhaust gas is in a stable state so that the deterioration determination of the sensor cell 42 can be started rapidly.

In the case of executing the first voltage switching, in step S12, the SCU detects a pump cell current Ip0 as a pump cell output before the switching of the pump cell applied voltage Vp to Vp1, that is, in the state in which the pump cell applied voltage Vp is Vp0.

After that, in step S13, the SCU switches the pump cell applied voltage Vp from Vp0 to Vp1. Referring to the time chart illustrated in FIG. 4, this step is performed at time t1. After that, in step S14, the SCU detects a sensor cell current Is1 at the start point P1 and a sensor cell current Is2 at the end point P2 in the first voltage switching. In step S15, the SCU detects the pump cell current Ip1 as a pump cell output after the switching of the pump cell applied voltage Vp to Vp1. The SCU detects the pump cell current Ip1 with a timing when a predetermined time has elapsed from the voltage switching (time t1), that is, with a timing when the pump cell current Ip becomes stable. The detection order of the sensor cell currents Is1 and Is2 and the pump cell current Ip1 can be set arbitrarily.

After that, in step S16, the SCU uses the following equation (1) to calculate the gradient A11 of the sensor cell current Is at the time of a transient response based on a current change amount $\Delta Is1$ ($=Is2-Is1$) as a difference between the sensor cell currents Is1 and Is2 at the start point P1 and the end point P2 and on a time difference $\Delta t1$ between the start point P1 and the end point P2:

$$A11=\Delta Is1/\Delta t1 \qquad (1)$$

The SCU also calculates the gradient A10 in the initial characteristics illustrated in FIG. 4 using the forgoing equation (1).

In step S17, the SCU calculates a gradient B11 by normalizing the gradient A11. In this case, the SCU uses the following equation (2) to calculate the normalized gradient B11 based on the gradient A11 of the sensor cell current Is at the time of the transient change and the change amount $\Delta Ip1$ ($=Ip0-Ip1$) of the pump cell current Ip due to the switching of the pump cell applied voltage Vp:

$$B11=A11/\Delta Ip1 \qquad (2)$$

In step S21, the SCU determines whether to perform the second voltage switching, that is, the switching of the pump cell applied voltage Vp to decrease the residual oxygen concentration in the gas chamber 61. In the case of performing the second voltage switching, the SCU moves to step S22 to switch the pump cell applied voltage Vp from Vp1 to Vp2. Referring to the time chart illustrated in FIG. 4, this process is performed at time t2. In the present embodiment, Vp2=Vp0.

After that, in step S23, the SCU detects a pump cell current Ip2 as a pump cell output after the switching of the pump cell applied voltage Vp to Vp2 (after the execution of the second voltage switching), that is, in the state in which the pump cell applied voltage Vp is Vp2. The SCU detects the pump cell current Ip2 with a timing when a predetermined time has elapsed from the voltage switching (time t2), that is, with a timing when the pump cell current Ip becomes stable.

After that, in step S24, the SCU calculates the pump cell output difference $\Delta Ipx$ as a difference between the pump cell currents Ip0 and Ip2 detected in steps S12 and S23 ($\Delta Ipx=Ip2-Ip0$). The pump cell output difference $\Delta Ipx$ is a concentration difference parameter indicating a difference in oxygen concentration between before the execution of the first voltage switching and after the execution of the second voltage switching. After that, in step S25, the SCU determines whether an absolute value of the pump cell output difference $\Delta Ipx$ is smaller than the predetermined threshold TH. When $|\Delta Ipx|<TH$, the SCU determines that the deterioration determination of the sensor cell 42 is valid and then moves to next step S26.

Figure 8:
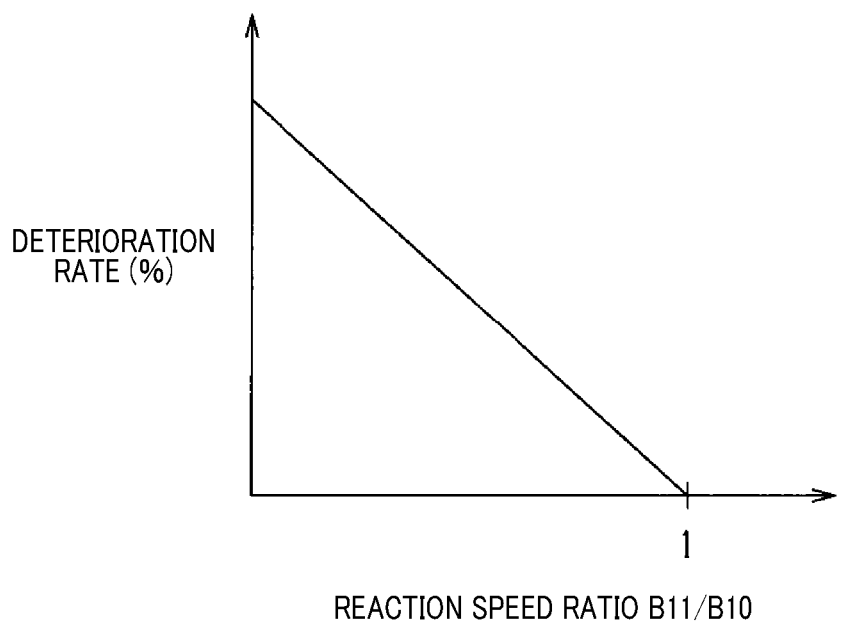
FIG. 8 is a diagram illustrating a relationship between reaction rate ratio and deterioration rate.

In step S26, the SCU uses the gradient B11 calculated in step S17 to calculate the deterioration rate C (%) of the sensor cell 42. At this time, the SCU calculates the ratio of the gradient B11 to the gradient B10 in the initial characteristics (B11/B10) as a reaction speed ratio, and uses the relationship illustrated in FIG. 8, for example, to calculate the deterioration rate C of the sensor cell 42 based on the reaction speed ratio B11/B10. The reaction speed ratio B11/B10 is determined as a ratio of the reaction speed to the oxygen supplied to the sensor cell 42. The gradient B10 indicating the initial characteristics is stored in advance in the memories in the SCUs 31 to 33. FIG. 8 illustrates the relationship in which, the smaller the reaction speed ratio B11/B10, that is, the larger the difference between the deterioration characteristics and the initial characteristics of the sensor cell 42, the greater the deterioration rate C becomes. The great deterioration rate C means that the degree of deterioration of the sensor cell 42 is high.

After that, in step S27, the SCU transmits the deterioration rate C of the sensor cell 42 to the engine ECU 35. At this time, considering that the determination in step S25 is performed, the SC transmits the deterioration rate C as the result of the deterioration determination of the sensor cell 42 to the engine ECU 35 on the condition that the pump cell output difference ΔIpx is smaller than the predetermined threshold TH.

When determining in step S25 that |ΔIpx|≥TH, the SCU determines that the deterioration determination of the sensor cell 42 is invalid and returns to step S11 to perform the determination again. That is, each of the SCUs 31 to 33 performs the first voltage switching again to acquire the output change parameter (steps S12 to S17), and then performs the second voltage switching again to acquire the concentration difference parameter (steps S22 to S24). Then, the SCU determines the deterioration state of the sensor cell 42 again based on the output change parameter and the concentration difference parameter (step S26).

In step S27, together with the deterioration rate C of the sensor cell 42, the SCU may transmit to the engine ECU 35 information indicating that the absolute value of the pump cell output difference ΔIpx was smaller than the predetermined threshold TH, that is, information indicating that the current deterioration determination has been normally performed. In addition, when making a NO determination in step S25 and performing the deterioration determination again, the SCU may transmit information indicating that re-execution of the determination to the engine ECU 35.

Figure 9:
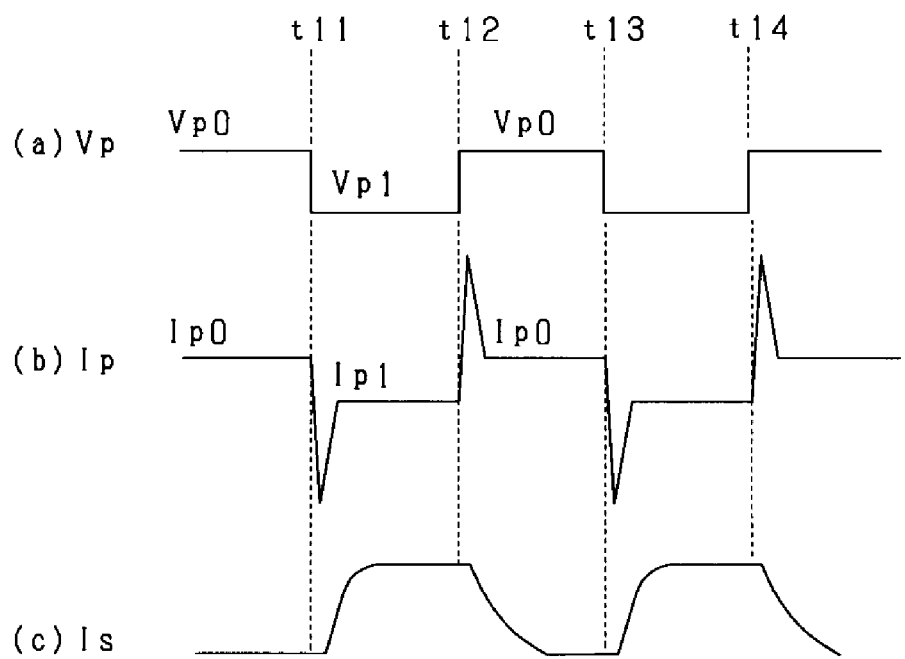
FIG. 9 is a time chart illustrating behavior in the case of performing a plurality of voltage switching cycles.

FIG. 9 is a time chart indicating behavior in the case of performing the voltage switching cycle a plurality of number of times. FIG. 9 illustrates two voltage switching cycles. Referring to FIG. 9, the pump cell applied voltage Vp is switched from Vp0 to Vp1 in the first voltage switching, and the pump cell applied voltage Vp is switched from Vp1 to Vp0 in the second voltage switching.

Referring to FIG. 9, the first voltage switching and the second voltage switching are respectively performed at times t11 and t12. In this case, when the oxygen concentration in the exhaust gas fluctuates in a period of t11 to t12, it is determined after time t12 that the absolute value of the pump cell output difference ΔIpx is equal to or greater than the predetermined threshold TH. Accordingly, it is determined that the deterioration determination in the current voltage switching cycle is invalid. Then, the first voltage switching and the second voltage are performed respectively at times t21 and t22. When it is determined that the deterioration determination in the current voltage switching cycle is valid, the deterioration determination of the sensor cell 42 is performed.

When determining in step S25 that |ΔIpx|≥TH, the SCU may terminate this process. In the case of terminating this process, the deterioration determination of the sensor cell 42 is invalidated by non-execution of the subsequent steps.

After the calculation of the deterioration rate C of the sensor cell 42, each of the SCUs 31 to 33 corrects the sensor cell current Is by the deterioration rate C for each of the NOx sensors 21 to 23 at the time of detection of the NOx concentration by the NOx sensors 21 to 23, and calculates the NOx concentration based on the corrected sensor cell current Is. In this case, the SCU corrects the sensor cell current Is to return the current sensor cell characteristics to the initial characteristics.

According to the embodiment described above in detail, the following excellent effects can be obtained.

When the oxygen concentration in the exhaust gas fluctuates in a period during which the output of the sensor cell 42 changes due to the switching of the pump cell applied voltage Vp, the deterioration determination of the sensor cell to be performed based on the output change parameters of the sensor cell 42 (the gradients A11 and A21) may be adversely affected by the fluctuation. In this respect, according to the foregoing configuration, the concentration difference parameter (pump cell output difference ΔIpx) indicating a difference in concentration between before the execution of the first voltage switching and after the execution of the second voltage switching, and the deterioration state of the sensor cell 42 is determined based on the output change parameter for the sensor cell 42 and the concentration difference parameter. This makes it possible to appropriately determine the deterioration state of the sensor cell 42 even if the oxygen concentration in the exhaust gas fluctuates in the period from the first voltage switching to the second voltage switching.

Calculating the pump cell output difference ΔIpx between before the execution of the first voltage switching and after the execution of the second voltage switching makes it possible to properly detect fluctuation in the oxygen concentration in the exhaust gas in the period from the first voltage switching to the second voltage switching. This allows appropriate determination of the deterioration state of the sensor cell 42.

In a situation in which there is no fluctuation in the oxygen concentration in the exhaust gas in the abnormality determination period from the first voltage switching to the second voltage switching, setting the pump cell applied voltage Vp to be the same between before the execution of the first voltage switching and after the execution of the second voltage switching keeps the pump cell current Ip and the sensor cell current Is unchanged in the abnormality determination period. In this respect, the pump cell applied voltage Vp0 before the execution of the first voltage switching and the pump cell applied voltage Vp2 after the execution of the second voltage switching are set to be the same, so that it is possible to properly detect the presence or absence of fluctuation in the oxygen concentration and the NOx concentration in the exhaust gas based on the pump cell current Ip and the sensor cell current Is.

It is determined whether the deterioration determination of the sensor cell 42 is valid or invalid based on the pump cell output difference ΔIpx as the concentration difference parameter. Specifically, it is determined that the deterioration determination of the sensor cell 42 is invalid when the difference in the oxygen concentration in the exhaust gas is equal to or greater than a predetermined value. This suppresses wrong determination of the deterioration state of the sensor cell 42.

When it is not determined that the deterioration determination of the sensor cell 42 is valid, the first voltage switching and the second voltage switching are executed again to perform the deterioration determination of the sensor cell 42 again. Performing the deterioration determination of the sensor cell 42 again makes it possible to obtain proper deterioration determination results even if the previous deterioration determination is improper. When it is determined that the deterioration determination of the sensor cell 42 is valid, there is no need for repeated deterioration determination (voltage switching), which enables a shortening of the time taken for the deterioration determination.

It is determined whether at least one of the oxygen concentration and the NOx concentration in the exhaust gas is in a stable state in which the fluctuation amount per unit time is equal to or less than the predetermined value, and on the condition that it is determined that the oxygen concentration or the NOx concentration is in a stable state, the switching of the pump cell applied voltage Vp (the execution of the first voltage switching and the second voltage switching) is permitted. This makes it possible to perform the deterioration determination of the sensor cell 42 in the state in which the oxygen concentration or the NOx concentration in the exhaust gas is stable after the stoppage of the engine, thereby achieving improvement in the accuracy of the determination.

The SCUs 31 to 33 transmit the results of the deterioration determination of the sensor cell 42 to the engine ECU 35 on the condition that the difference in the oxygen concentration in the exhaust gas between before the execution of the first voltage switching and after the execution of the second voltage switching is smaller than the predetermined value. This allows the engine ECU 35 to perform an abnormality diagnosis of the exhaust system based on the accurate results of deterioration determination of the sensor cell 42, thereby enhancing the reliability of the abnormality diagnosis.

Hereinafter, other embodiments will be described centered on differences from the first embodiment.

Second Embodiment

In a second embodiment, a deterioration determination unit M14 corrects the results of deterioration determination of a sensor cell 42 based on a concentration difference parameter calculated by a concentration difference calculation unit M13. Specifically, SCUs 31 to 33 perform a deterioration determination process illustrated in FIG. 10 instead of the deterioration determination process illustrated in FIG. 7 described above. The process illustrated in FIG. 10 is partially changed from the process illustrated in FIG. 7, where the same steps as those illustrated in FIG. 7 are given the same step numbers as those illustrated in FIG. 7.

Figure 10:
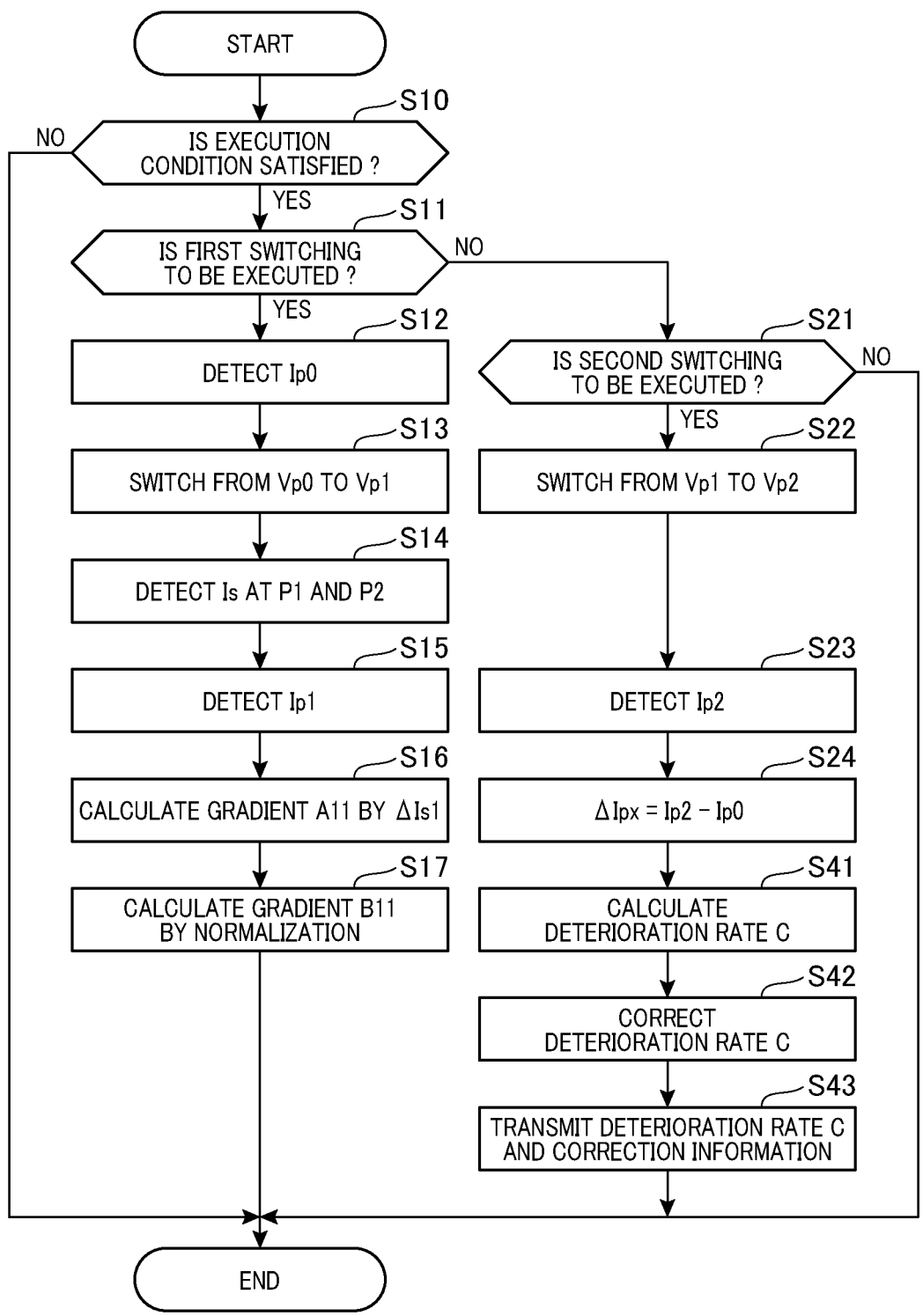
FIG. 10 is a flowchart of a process for deterioration determination of a sensor cell in a second embodiment.

Referring to FIG. 10, in step S24, each of the SCUs calculates a pump cell output difference $\Delta Ipx$ ($\Delta Ipx = Ip2 - Ip0$) as a concentration difference parameter, and then moves to step S41. In step S41, the SCU uses a gradient B11 calculated in step S17 to calculate a deterioration rate C of the sensor cell 42. The procedure for calculation of the deterioration rate C is similar to step S26 illustrated in FIG. 7.

After that, in step S42, each of the SCUs corrects the deterioration rate C based on the pump cell output difference $\Delta Ipx$. If the pump cell output difference $\Delta Ipx$ has a positive value (that is, Ip2>Ip0), it is considered that the oxygen concentration in the exhaust gas increased in a time between the first voltage switching and the second voltage switching, and that the gradient of response change of a sensor cell current Is has become large due to the increase. Accordingly, the SCU corrects and decreases the deterioration rate C to compensate for the increase in the oxygen concentration. In contrast, when the pump cell output difference $\Delta Ipx$ has a negative value (that is, Ip2<Ip0), it is considered that the oxygen concentration in the exhaust gas has decreased in the time between the first voltage switching and the second voltage switching, and that the gradient of response change of the sensor cell current Is has become small due to the decrease. Accordingly, the SCU corrects and increases the deterioration rate C to compensate for the decrease in the oxygen concentration.

Figure 11:
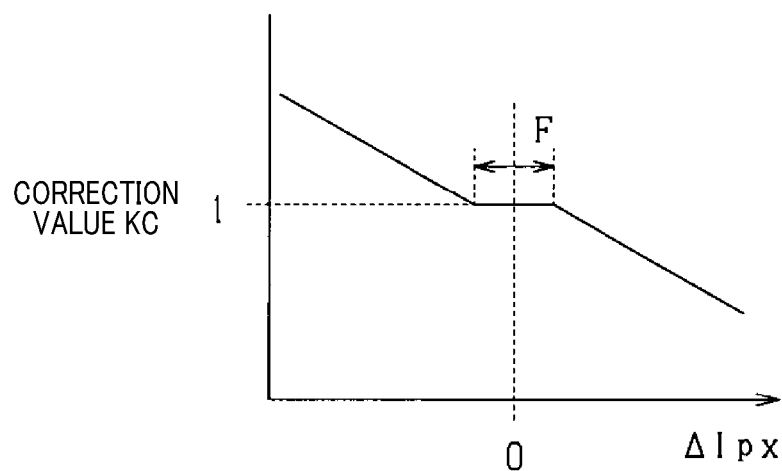
FIG. 11 is a diagram illustrating a relationship between a pump cell output difference $\Delta Ipx$ and a correction value KC.

Specifically, each of the SCUs 31 to 33 uses the relationship illustrated in FIG. 11, for example, to calculate a correction value KC based on the pump cell difference $\Delta Ipx$, and calculates the corrected deterioration rate C by the product of the correction value KC and the deterioration rate C. Referring to FIG. 11, there is provided a dead zone F in which the correction value KC is set to zero in the vicinity of $\Delta Ipx=0$. However, the dead zone can be eliminated.

The SCU may perform the process only either in a case in which the pump cell output difference $\Delta Ipx$ has a positive value or in a case in which the pump cell output difference $\Delta Ipx$ has a negative value. In this case, in step S42, the SCU performs only either the process of correcting and decreasing the deterioration rate C on the condition that the pump cell output difference $\Delta Ipx$ has a positive value or the process of correcting and increasing the deterioration rate C on the condition that the pump cell output difference $\Delta Ipx$ has a negative value.

After that, in step S43, the SCU transmits to the engine ECU 35 the deterioration rate C of the sensor cell 42 and the correction information of the deterioration rate C. In this case, each of the SCUs 31 to 33 transmits to the engine ECU 35 the pump cell output difference $\Delta Ipx$ as the concentration difference information and the information of the correction value KC based on the pump cell output difference $\Delta Ipx$.

In the present embodiment described above, the deterioration rate of the sensor cell 42 (the result of the deterioration determination) is corrected based on the pump cell output difference $\Delta Ipx$ as the concentration difference parameter. This makes it possible to properly determine the deterioration state of the sensor cell 42 even if the oxygen concentration in the exhaust gas has fluctuated in the period between before the execution of the first voltage switching and after the execution of the second voltage switching.

When the pump cell output difference $\Delta Ipx$ has a positive value, that is, when the oxygen concentration in the exhaust gas has increased in the time between the first voltage switching and the second voltage switching, the deterioration rate C is corrected and decreased to compensate for the increase in the oxygen concentration. When the pump cell difference $\Delta Ipx$ has a negative value, that is, when the oxygen concentration in the exhaust gas has decreased in the time between the first voltage switching and the second voltage switching, the deterioration rate C is corrected and increased to compensate for the decrease in the oxygen concentration. This makes it possible to properly calculate the deterioration rate C while dealing with the change of the oxygen concentration in the exhaust gas in the voltage switching cycle.

Each of the SCUs 31 to 33 transmits to the engine ECU 35 the result of the deterioration determination of the sensor cell 42 and the concentration difference information used in the deterioration determination. Accordingly, the engine ECU 35 can properly perform an abnormality diagnosis of the exhaust system based on the results of the deterioration determination of the sensor cell 42.

As described above with reference to FIG. 7, in the case of $|\Delta Ipx| \geq TH$, the deterioration determination of the sensor cell 42 may be regarded as invalid, and in the case of $|\Delta Ipx| < TH$, the deterioration rate C may be corrected based on the pump cell output difference $\Delta Ipx$.

Third Embodiment

In a third embodiment, a voltage switching unit M11 performs a voltage switching cycle including a first voltage switching and a second voltage switching a plurality of number of times at predetermined time intervals. In addition, a deterioration determination unit M14 determines a deterioration state of a sensor cell 42 based on, among concentration parameters calculated by a concentration difference calculation unit M13 in the plurality of voltage switching cycles, an output change parameter in the voltage switching cycle with the smallest concentration difference.

Figure 12:
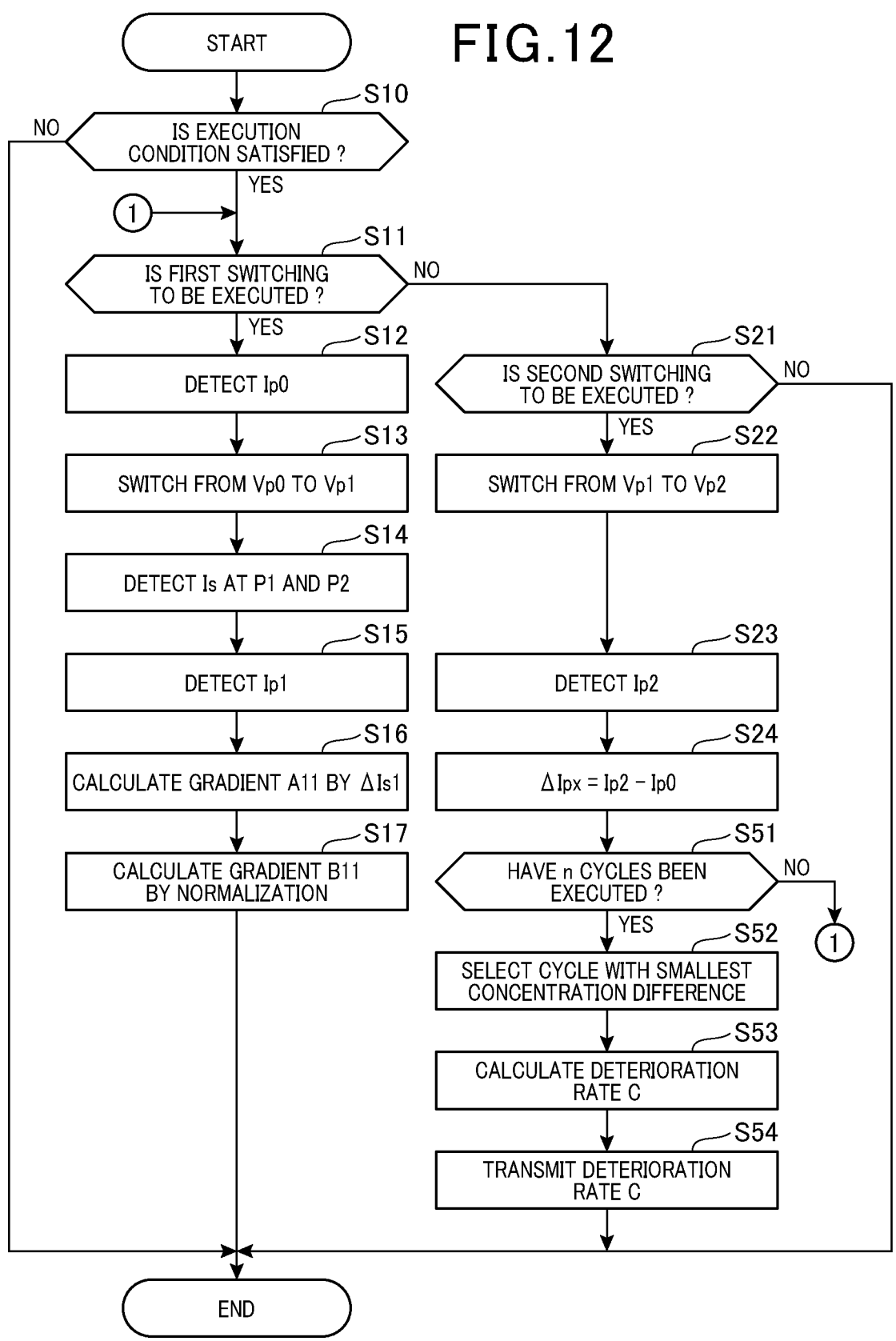
FIG. 12 is a flowchart of a process for deterioration determination of a sensor cell in a third embodiment.

Specifically, SCUs 31 to 33 perform a deterioration determination process illustrated in FIG. 12 instead of the deterioration determination process illustrated in FIG. 7 described above. The process illustrated in FIG. 12 is partially changed from the process illustrated in FIG. 7, where the same steps as those illustrated in FIG. 7 are given the same step numbers as those illustrated in FIG. 7.

Referring to FIG. 12, in step S24, each of the SCUs calculates a pump cell output difference $\Delta Ipx$ ($\Delta Ipx = Ip2 - Ip0$) as a concentration difference parameter, and then moves to step S51. In step S51, the SCU determines whether the voltage switching cycle including the first voltage switching and the second voltage switching has been performed n times, where n denotes two or more, for example, n=2 or n=3. When making a negative determination in step S51, the SCU returns to step S11. That is, each of the SCUs 31 to 33 performs the first voltage switching again to acquire the output change parameter (steps S12 to S17), and then performs the second voltage switching again to acquire the concentration difference parameter (steps S22 to S24).

When making an affirmative determination in step S51, the SCU selects the voltage switching cycle with the smallest pump cell output difference $\Delta Ipx$ (concentration difference) from among the n voltage switching cycles. Then, in step S53, the SCU uses a gradient B11 (output change parameter) in the voltage switching cycle with the smallest pump cell output difference $\Delta Ipx$ to calculate the deterioration rate C of the sensor cell 42. The procedure for calculation of the deterioration rate C is similar to step S26 illustrated in FIG. 7.

After that, in step S54, the SCU transmits the deterioration rate C of the sensor cell 42 to the engine ECU 35. At this time, the SCU may transmit to the engine ECU 35 the deterioration rate C together with information on the concentration difference parameter in the voltage switching cycle finally used for the calculation of the deterioration rate C.

In the present embodiment, the deterioration state of the sensor cell 42 is determined based on the output change parameter for the sensor cell 42 in the voltage switching cycle with the smallest pump cell output difference $\Delta Ipx$ as the concentration difference parameter among the plurality of voltage switching cycles. Accordingly, even if the oxygen concentration in the exhaust gas fluctuates in the time from before the execution of the first voltage switching to the second voltage switching in any of the voltage switching cycle, it is possible to properly determine the deterioration state of the sensor cell 42 while eliminating the determination result in that voltage switching cycle.

In the case of performing three or more voltage switching cycles, the output change parameter in the voltage switching cycle with the smallest concentration difference and the output change parameter in the voltage switching cycle with the second smallest concentration difference can be used, for example. In the case of using the output change parameters in a plurality of voltage switching cycles, the average of the deterioration rate C is preferably set to the final deterioration rate C, for example. In short, the deterioration state of the sensor cell 42 is preferably determined using the output change parameter in the voltage switching cycle with the smallest concentration difference. In the case of performing a plurality of (two or more) voltage switching cycles, all the output change parameters with concentration differences smaller than a predetermined value may be used.

Other Embodiments

The foregoing embodiments may be modified as described below, for example.

In the foregoing embodiments, in the case where the oxygen concentration difference between before and after the switching of the pump cell applied voltage Vp is equal to or greater than a predetermined value (in the case of $|\Delta Ipx| \geq TH$ in step S25), the calculation of the deterioration rate C (deterioration determination) is not performed based on the output change parameter acquired in the voltage switching cycle and the deterioration determination is invalidated by non-execution of calculation of the deterioration rate C. However, this configuration may be modified. For example, in the case of performing the first voltage switching, the deterioration rate C may be calculated based on the output change parameter obtained by that voltage switching, and then the deterioration rate C calculated this time may be invalidated on the condition that the oxygen concentration difference between before and after the switching of the pump cell applied voltage Vp is equal to or greater than a predetermined value.

In the foregoing embodiments, the concentration difference calculation unit M13 calculates the concentration difference (the pump cell output difference $\Delta Ipx$) in the oxygen concentration in the exhaust gas between before the execution of the first voltage switching and after the execution of the second voltage switching. However, this configuration may be modified. For example, the concentration difference calculation unit M13 may calculate the concentration difference (the sensor cell output difference $\Delta Isx$) in the NOx concentration in the exhaust gas between before the execution of the first voltage switching and after the second voltage switching. In this case, the SCUs 31 to 33 calculate the sensor cell output difference $\Delta Isx$ from the difference between the sensor cell current Is before the execution of the first voltage switching and the sensor cell current Is after the execution of the second voltage switching. Then, when the absolute value of the sensor cell output difference $\Delta Isx$ is smaller than a predetermined value, each of the SCUs determines that the deterioration determination of the sensor cell 42 is valid, and when the absolute value of the sensor cell output difference $\Delta Isx$ is equal to or greater than the predetermined value, each of the SCUs determines that the deterioration determination of the sensor cell 42 is invalid. In addition, the deterioration rate C may be corrected based on the sensor cell output difference $\Delta Isx$.

The concentration difference calculation unit M13 may calculate a monitor cell output difference as the oxygen concentration difference between before the execution of the first voltage switching and after the execution of the second voltage switching, from the difference between the monitor cell current Inn before the execution of the first voltage switching and the monitor cell current Inn after the execution of the second voltage switching.

In the foregoing embodiments, at the deterioration determination of the sensor cell 42, the gradient A11 of the sensor cell current Is at the time of transient change due to the execution of the first voltage switching is calculated, and the deterioration determination is performed using the gradient A11 (specifically, the gradient B11 obtained by normalizing the gradient A11). However, this configuration may be modified. For example, the gradient A21 of the sensor cell current Is at the time of transient change due to the execution of the second voltage switching may be calculated and the deterioration determination may be performed using the gradient A21.

Alternatively, as the output change parameters, the gradient A11 of the sensor cell current Is at the time of transient change due to the execution of the first voltage switching and the gradient A21 of the sensor cell current Is at the time of transient change due to the execution of the second voltage switching may be calculated, and the deterioration determination of the sensor cell 42 may be performed based on these gradients A11 and A21. For example, the deterioration determination is performed using the larger one (or the smaller one) of the gradients A11 and A12. Otherwise, the deterioration determination is performed using the average of the gradients A11 and A21.

In the present embodiments, it is determined whether the oxygen concentration and the NOx concentration in the exhaust gas are in a stable state where the fluctuation amounts per unit time are equal to or smaller than predetermined values by monitoring changes in the pump cell current Ip and the sensor cell current Is after the stoppage of the engine or the like. However, this configuration may be modified. For example, it may be determined whether the oxygen concentration and the NOx concentration in the exhaust gas become stable by a time elapsed after the stoppage of the engine. In this case, the SCUs 31 to 33 measure the time elapsed from the engine stoppage (IG turn-off) and determine that the oxygen concentration and the NOx concentration in the exhaust gas become stable when the elapsed time has reached a predetermined length of time (for example, several minutes).

At the deterioration determination of the sensor cell 42, in the case of switching the pump cell applied voltage Vp to increase the oxygen concentration in the gas chamber 61 (in the case of performing the first voltage switching), the pump cell applied voltage Vp may be switched to zero, that is, may be switched to a state with no voltage application. Otherwise, the pump cell applied voltage Vp may be switched to a negative voltage. In either case, the oxygen concentration in the gas chamber 61 is increased due to the switching of the applied voltage, and the deterioration determination can be performed by the transient response of the sensor cell 42 at that time.

In the foregoing embodiments, the gradient of transient change is calculated by the current change amount ΔIs per unit time Δt in the transient period of the sensor cell current Is as the "gradient parameter" of the sensor cell current Is. Alternatively, the current change amount ΔIs in a predetermined time may be used as the gradient parameter. Otherwise, the duration of the time necessary for generation of a predetermined current change amount may be used as the gradient parameter. In short, the gradient of the sensor cell current Is or a value correlating to this is preferably calculated as the gradient parameter.

In the present embodiments, the gradient B11 is calculated by normalizing the gradient A11 of the sensor cell current Is and the deterioration rate C is calculated using the gradient B11. However, this configuration may be modified. For example, the deterioration rate C may be calculated using the gradient A11.

The deterioration rate C of the sensor cell 42 can be calculated using an element other than the gradient (the gradient parameter) of the sensor cell current Is. For example, a convergent value of a change in the sensor cell current Is after the switching of the pump cell applied voltage Vp may be calculated as the sensor cell current change amount ΔIs, and the deterioration rate of the sensor cell 42 may be calculated using that current change amount ΔIs.

In the foregoing embodiments, as the determination of the deterioration rate of the sensor cell 42, the deterioration rate C (%) as the ratio between the present characteristics and the initial characteristics of the sensor cell 42 is calculated. However, the present disclosure is not limited to this configuration. For example, the difference of the gradient of the sensor cell current Is as the deterioration determination parameter for the sensor cell 42, a value correlating to this, or the current change amount ΔIs after the convergence of the sensor cell current Is from the initial value may be calculated, and the degree of deterioration of the sensor cell 42 may be detected based on the difference. Otherwise, the comparison may be performed not with the initial value but with a predetermined standard value. The degree of the deterioration may be determined by an index represented as "100−the deterioration rate C". In this case, according to the index, the value of the characteristics is initially represented as 100%, and becomes lower along with the progress of the deterioration. In either case, the deterioration state, that is, the degree of deterioration is determined based on the characteristic change of the sensor cell 42.

Figure 13:
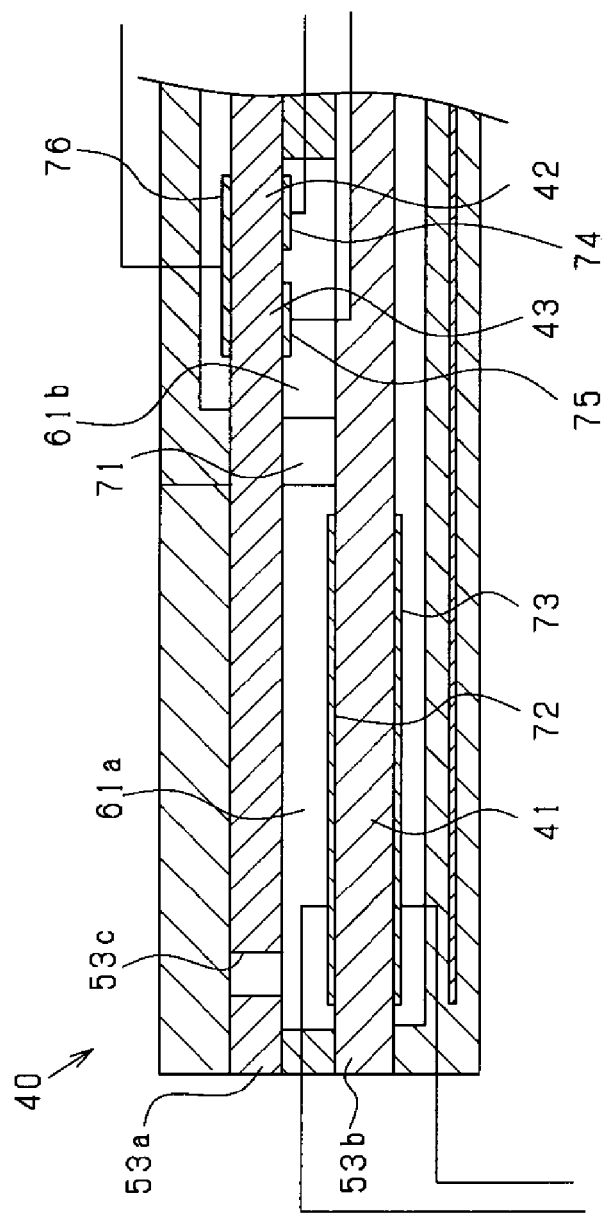
FIG. 13 is a cross-sectional view of a configuration of another NOx sensor.

In the foregoing embodiments, the sensor element 40 has the single solid electrolyte body 53 and the single gas chamber 61. However, this configuration may be modified. For example, the sensor element 40 may have a plurality of solid electrolyte bodies 53 and a plurality of gas chambers 61, and the pump cell 41 and the sensor cell 42 may be provided in the different solid electrolyte bodies 53 and faced to the different gas chambers 61. FIG. 13 illustrates an example of this configuration.

A sensor element 40 illustrated in FIG. 13 has two solid electrolyte bodies 53a and 53b opposed to each other and gas chambers 61a and 61b between the solid electrolyte bodies 53a and 53b. The gas chamber 61a communicates with an exhaust gas introduction port 53c, and the gas chamber 61b communicates with the gas chamber 61a via a drawn portion 71. The pump cell 41 has a pair of electrodes 72 and 73, and one electrode 72 is exposed to the inside of the gas chamber 61a. The sensor cell 42 has an electrode 74 and a common electrode 76 opposed to each other. The monitor cell 43 has an electrode 75 and the common electrode 76 opposed to each other. The sensor cell 42 and the monitor cell 43 are adjacent to each other. In these cells, the electrodes 74 and 75 on one side are exposed to the inside of the gas chamber 61b. According to the configuration in which the pump cell 41 and the sensor cell 42 are provided in the different gas chambers 61a and 61b as well, it is possible to favorably implement the functions in the foregoing embodiments such as the deterioration determination.

The sensor element 40 in each of the NOx sensors 21 to 23 can have a two-cell structure of a pump cell and a sensor cell.

The specific gas component to be detected may be different from NOx. For example, the gas sensor may be targeted for detection of HC or CO in the exhaust gas. In this case, the gas sensor preferably discharges oxygen in the exhaust gas by the pump cell and decomposes HC or CO from the gas after the discharge of the oxygen to detect the HC concentration or the CO concentration. Otherwise, the gas sensor may be supposed to detect the concentration of ammonia in the detection target gas.

The present disclosure can also be embodied as a gas sensor control device that is targeted for a gas sensor used in other types of engines such as a gas sensor provided in the intake path of an internal combustion engine or a gasoline engine other than a diesel engine. The gas sensor may be targeted for a detection target gas other than the exhaust gas or may be applied for purposes other than automobiles.

The present disclosure has been described so far according to the embodiments, but it is noted that the present disclosure is not limited to the foregoing embodiments or structures. The present disclosure includes various modifications and changes in a range of equivalency. In addition, various combinations and modes, and other combinations and modes including only one element of the foregoing combinations and modes, less or more than the one element are included in the scope and conceptual range of the present disclosure.

What is claimed is:

1. A system comprising:
a gas sensor having: a pump cell that adjusts an oxygen concentration in a detection target gas introduced into a gas chamber by application of a voltage; and a sensor cell that detects a concentration of a specific gas component from the detection target gas after the adjustment of the oxygen concentration by the pump cell, and
a gas sensor control device that is applied to the gas sensor and that performs a control related to the gas sensor,
wherein the gas sensor control device comprises one or more CPUs, and the one or more CPUs is configured to:
perform a first voltage switching by which to switch an applied voltage to the pump cell to increase the oxygen concentration in the gas chamber and a second voltage switching by which to switch the applied voltage to decrease the oxygen concentration in the gas chamber after the execution of the first voltage switching;
in at least one of a state having undergone the first voltage switching and a state having undergone the second voltage switching, calculate an output change parameter indicating a change in output of the sensor cell according to the first voltage switching or the second voltage switching, the output change parameter being based on a gradient of sensor cell current of the sensor cell during a transient change when the first voltage switching or the second voltage switching is carried out;
calculate a concentration difference parameter indicating a concentration difference in the oxygen concentration or in the concentration of the specific gas component in the detection target gas between before the execution of the first voltage switching and after the execution of the second voltage switching;
perform deterioration determination in which a deterioration state of the sensor cell is determined based on the calculated output change parameter; and
determine whether the deterioration determination of the sensor cell is valid based on the calculated concentration difference parameter.

2. The system according to claim 1, wherein,
the one or more CPUs is configured to calculate, as the concentration difference parameter, an output difference in the pump cell or an output difference in the sensor cell between before the execution of the first voltage switching and after the execution of the second voltage switching, and
determine the deterioration state of the sensor cell based on the calculated output change parameter and the calculated output difference in the pump cell or the output difference in the sensor cell.

3. The system according to claim 2, wherein the one or more CPUs is configured to set the applied voltage to the pump cell at the execution of the second voltage switching to be the same as the applied voltage to the pump cell before the execution of the first voltage switching.

4. The system according to claim 1, wherein, when not determining that the deterioration determination of the sensor cell is valid, the one or more CPUs is configured to again perform the first voltage switching and the second voltage switching, and after repeated switchings, determine the deterioration state of the sensor cell again based on the calculated output change parameter and the calculated concentration difference parameter.

5. The system according to claim 1, wherein the one or more CPUs is configured to correct a result of the deterioration determination of the sensor cell based on the calculated concentration difference parameter.

6. The system according to claim 5, wherein, when the concentration difference parameter corresponds to the oxygen concentration or the concentration of the specific gas component that becomes greater after the execution of the second voltage switching than before the execution of the first voltage switching, the one or more CPUs is configured to correct the result of the deterioration determination of the sensor cell for a degree of deterioration to become lower.

7. The system according to claim 5, wherein, when the concentration difference parameter corresponds to the oxygen concentration or the concentration of the specific gas component that becomes smaller after the execution of the second voltage switching than before the execution of the first voltage switching, the one or more CPUs is configured to correct the result of the deterioration determination of the sensor cell for a degree of deterioration to become higher.

8. The system according to claim 1, wherein the one or more CPUs is configured to:
perform a plurality of voltage switching cycles including the first voltage switching and the second voltage switching at predetermined time intervals, and
determine the deterioration state of the sensor cell based on, among the calculated concentration difference parameters in the plurality of voltage switching cycles, the output change parameter in the voltage switching cycle with a smallest concentration difference.

9. The system according to claim 1, comprising:
the one or more CPUs is configured to determine whether at least one of the oxygen concentration and the concentration of the specific gas component in the detection target gas is in a stable state in which a fluctuation amount per unit time is equal to or less than a predetermined value; and
permit the execution of the first voltage switching and the execution of the second voltage switching on condition that the concentration is in the stable state.

10. The system according to claim 1, wherein,
the gas sensor is an exhaust sensor that detects the concentration of the specific gas component in an exhaust gas as the detection target gas emitted from an internal combustion engine,
the gas sensor control device is enabled to communicate with an engine control device to perform a control of the internal combustion engine or a control of an exhaust system in the internal combustion engine, and
the one or more CPUs is configured to transmit the result of the deterioration determination to the engine control device on condition that the calculated concentration difference parameter corresponds to the concentration difference smaller than a predetermined value.

11. The system according to claim 1, wherein,
the gas sensor is an exhaust sensor that detects the concentration of the specific gas component in an exhaust gas as the detection target gas emitted from an internal combustion engine,
the gas sensor control device is enabled to communicate with an engine control device to perform a control of the internal combustion engine or a control of an exhaust system in the internal combustion engine, and
the one or more CPUs is configured to transmit the result of the deterioration determination and information on the calculated concentration difference parameter to the engine control device.

12. The system according to claim 1, wherein, when determining that the deterioration determination of the sensor cell is valid, the one or more CPUs is further configured to calculate a deterioration rate of the sensor cell.

13. The system according to claim 12, wherein the one or more CPUs is further configured to:
determine a normalized gradient based on the gradient of the sensor cell current; and
use the normalized gradient to calculate the deterioration rate of the sensor cell.

14. The system according to claim 12, wherein the one or more CPUs is further configured to:
determine an emission abnormality based on the deterioration rate of the sensor cell and at least one output of the gas sensor.

* * * * *